(12) United States Patent
Arakane et al.

(10) Patent No.: US 11,491,800 B2
(45) Date of Patent: Nov. 8, 2022

(54) PRINTING APPARATUS AND MEDIUM STORING COMPUTER PROGRAM

(71) Applicant: BROTHER KOGYO KABUSHIKI KAISHA, Nagoya (JP)

(72) Inventors: Satoru Arakane, Nagoya (JP); Masao Mimoto, Kitanagoya (JP); Tsuyoshi Ito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 49 days.

(21) Appl. No.: 17/210,690

(22) Filed: Mar. 24, 2021

(65) Prior Publication Data

US 2021/0300059 A1     Sep. 30, 2021

(30) Foreign Application Priority Data

Mar. 24, 2020   (JP) .............................. JP2020-052702

(51) Int. Cl.
*G06K 15/10*     (2006.01)
*B41J 2/21*      (2006.01)

(52) U.S. Cl.
CPC .......... *B41J 2/2132* (2013.01); *G06K 15/105* (2013.01)

(58) Field of Classification Search
CPC ........................... G06K 15/105; G06K 15/107
See application file for complete search history.

(56) References Cited

U.S. PATENT DOCUMENTS

| | | | |
|---|---|---|---|
| 2011/0090538 A1* | 4/2011 | Ishikawa ............... | G06K 15/107 358/3.21 |
| 2015/0178599 A1* | 6/2015 | Ushiyama ............ | G06K 15/107 358/1.8 |
| 2017/0274643 A1 | 9/2017 | Takeuchi et al. | |
| 2018/0213125 A1* | 7/2018 | Takeuchi ............. | G06K 15/105 |
| 2019/0286955 A1* | 9/2019 | Hasegawa ............. | H04N 1/034 |
| 2020/0055310 A1* | 2/2020 | Wakabayashi .......... | B41J 2/155 |
| 2021/0402798 A1* | 12/2021 | Arakane ............. | G06K 15/107 |

FOREIGN PATENT DOCUMENTS

JP   2017-170719 A   9/2017
JP   2018-118382 A   8/2018

\* cited by examiner

*Primary Examiner* — Julian D Huffman
(74) *Attorney, Agent, or Firm* — Scully, Scott, Murphy & Presser, PC

(57) ABSTRACT

A printing apparatus includes: a print execution section and a controller. The print execution section includes: a printing head having nozzles, an ink having a specified color being discharged from the nozzles; a head driver which drives the printing head to form dots having the specified color on a printing medium by discharging the ink having the specified color from the nozzles; and a movement mechanism which moves the printing medium relative to the printing head. The controller is configured to: obtain object image data; generate, by using the object image data, a plurality of pieces of dot data indicating formation states of the dots having the specified color, for a plurality of pixels; and print a printing image by causing the print execution section to execute discharge of the ink having the specified color and movement of the printing medium by use of the pieces of dot data.

20 Claims, 17 Drawing Sheets

PATTERN DATA

RECORDING RATIO

RGB COLOR SPACE CC

Fig. 12B

COLOR EVALUATION INFORMATION CI

MAIN TABLE MT

| No. | RGB VALUE | | | CORRESPONDING TABLE |
|---|---|---|---|---|
|   | R | G | B |   |
| 1 | 0 | 0 | 0 | CT1 |
| 2 | 0 | 0 | 32 | CT2 |
| 3 | 0 | 0 | 64 | CT3 |
| 4 | 0 | 0 | 96 | CT4 |
| 82 | 32 | 32 | 0 | CT82 |
| 83 | 32 | 32 | 32 | CT83 |
| 84 | 32 | 32 | 64 | CT84 |
| 85 | 32 | 32 | 96 | CT85 |
| 86 | 32 | 32 | 128 | CT86 |
| 726 | 255 | 255 | 160 | CT726 |
| 727 | 255 | 255 | 192 | CT727 |
| 728 | 255 | 255 | 224 | CT728 |
| 729 | 255 | 255 | 255 | CT729 |

CORRESPONDING TABLE CT1

| No. | RGB VALUE | | | WEIGHT |
|---|---|---|---|---|
|   | R | G | B | Wt |
| 1 | 0 | 0 | 0 | Wt1 |
| 2 | 0 | 0 | 32 | Wt 2 |
| 3 | 0 | 0 | 64 | Wt 3 |
| 4 | 0 | 0 | 96 | Wt 4 |
| 82 | 32 | 32 | 0 | Wt 82 |
| 83 | 32 | 32 | 32 | Wt 83 |
| 84 | 32 | 32 | 64 | Wt 84 |
| 85 | 32 | 32 | 96 | Wt 85 |
| 86 | 32 | 32 | 128 | Wt 86 |
| 726 | 255 | 255 | 160 | Wt 726 |
| 727 | 255 | 255 | 192 | Wt 727 |
| 728 | 255 | 255 | 224 | Wt 728 |
| 729 | 255 | 255 | 255 | Wt 729 |

...

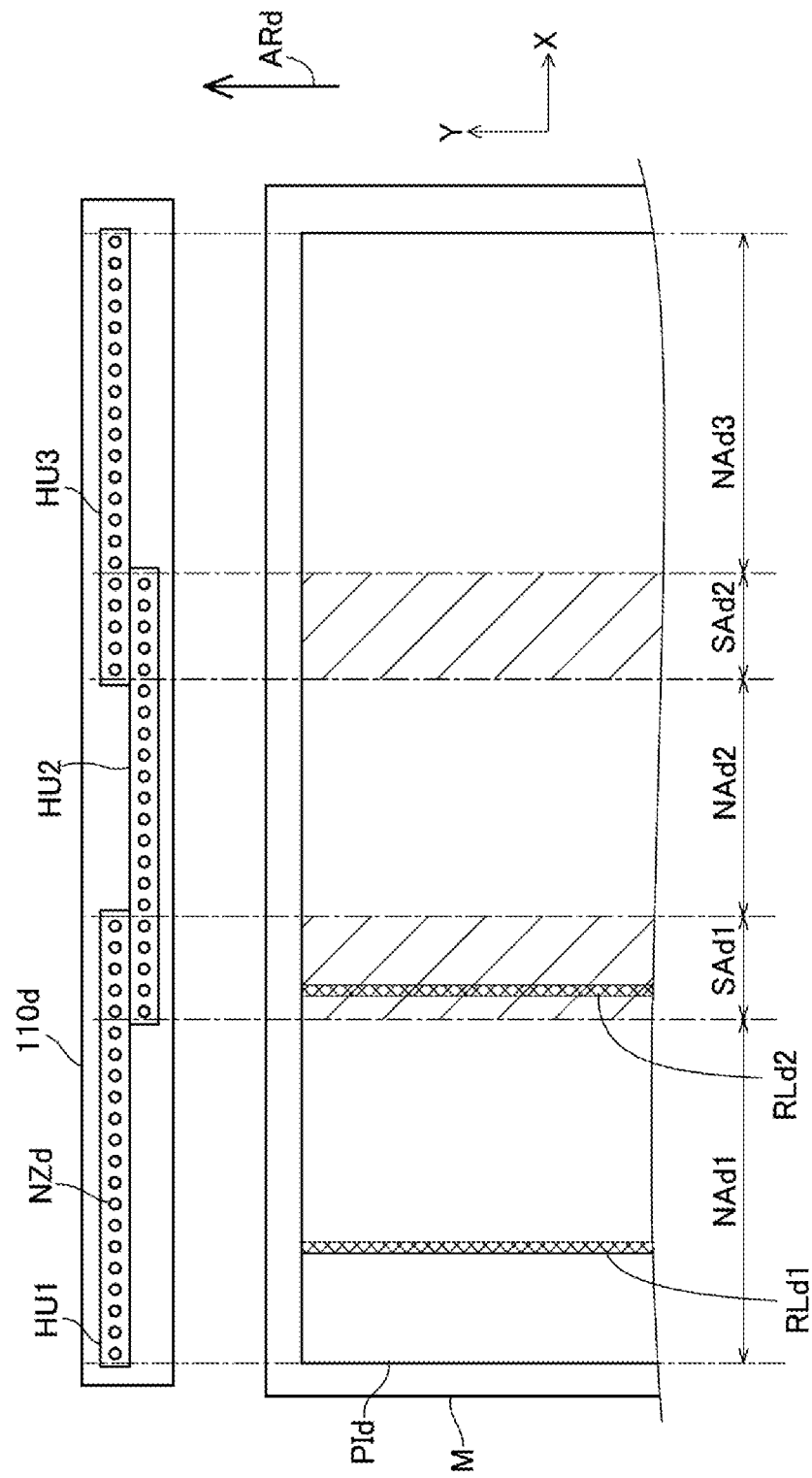

PRINTING APPARATUS AND MEDIUM STORING COMPUTER PROGRAM

CROSS REFERENCE TO RELATED APPLICATION

The present application claims priority from Japanese Patent Application No. 2020-52702 filed on Mar. 24, 2020, the disclosure of which is incorporated herein by reference in its entirety.

BACKGROUND

Field of the Invention

The present specification relates to a printing apparatus including a print execution section and a controller, and a computer program.

Description of the Related Art

There is a known printer wherein in a case that the printer performs printing by executing a plurality of passes, the printer performs printing for a partial area in the vicinity of a boundary between bands by two passes, and performs printing for another area(s) different from the partial area by one pass. A plurality of dots forming a raster line in a joint area printed by two passes are formed by using two nozzles. A plurality of dots forming a raster line in an ordinary area printed by one pass are formed by using one nozzle. In the above-described printer, a look-up table used for a color conversion process in the joint area is different from a look-up table used for a color conversion process in the ordinary area. This reduces any color unevenness (color irregularity) caused between the ordinary area and the joint area.

However, in the above-described technique, it is considered that the extent of the color unevenness depends on the material of a printing medium, the temperature, the humidity, etc., and thus the extent of any color unevenness due to any difference in color between the joint area and the ordinary area is not fully considered. Accordingly, there is such a possibility that the color unevenness cannot be reduced, depending on the color of the joint area and/or the color of the ordinary area.

The present specification discloses a technique capable of effectively suppressing the occurrence of color unevenness caused in the areas.

According to a first aspect of the present disclosure, there is provided a printing apparatus including:

a print execution section; and a controller, wherein the print execution section includes:

a printing head having a plurality of nozzles arranged in a first direction, an ink having a specified color being discharged from the nozzles;

a head driver configured to drive the printing head to form a plurality of dots having the specified color on a printing medium by discharging the ink having the specified color from the nozzles; and a movement mechanism configured to move the printing medium relative to the printing head in any of the first direction and a second direction intersecting with the first direction, wherein the controller is configured to:

obtain a piece of object image data;

generate, by using the object image data, a plurality of pieces of dot data indicating formation states of the dots having the specified color, for a plurality of pixels; and print a printing image by causing the print execution section to execute discharge of the ink having the specified color and movement of the printing medium by use of the pieces of dot data, the printing image includes a plurality of raster lines, each of the raster lines including a part of the dots having the specified color, the part of the dots being arranged in the second direction, the raster lines include a plurality of first raster lines included in a first area of the printing image, and a plurality of second raster lines included in a second area, of the printing image, which is adjacent to the first area in the first direction, the part of the dots having the specified color and forming each of the first raster lines are formed by one nozzle included in the nozzles and corresponding to each of the first raster lines, the part of the dots having the specified color and forming each of the second raster lines are formed by two or more nozzles included in the nozzles and corresponding to each of the second raster lines, the controller is configured to:

execute a first area process on a piece of first partial image data included in the object image data and corresponding to the first area, to generate a plurality of pieces of first partial dot data included in the pieces of dot data and corresponding to the first area; and execute a second area process on a piece of second partial image data included in the object image data and corresponding to the second area, to generate a plurality of pieces of second partial dot data included in the pieces of dot data and corresponding to the second area, in the second area process, the pieces of second partial dot data are generated so that an image of the second area is printed at a density equal to or less than a density in a case that the first area process is executed on the second partial image data, and the controller is configured to:

determine a correction level indicating a degree of lowering the density of the image in the second area in the second area process, by using the second partial image data included in the object image data and corresponding to the second area and the first partial image data included in the object image data and corresponding to the first area; and execute the second area process based on the correction level.

In the second area in which the plurality of pieces of the dot of the specified color on the raster line are formed by using not less than two nozzles, a certain dot formed by one nozzle spreads on the printing medium, and then another dot is formed by another nozzle so as to overlap with the certain dot. Accordingly, the total area of the dot of the specified color in the second area tends to be greater than the total area of a dot of the specified color in the first area. Therefore, even in a case that images are formed by using same image data, the density of the image formed in the second area tends to be higher than the density of the image formed in the first area. Due to this, the extent by which any color unevenness is conspicuous between the first and second areas is different depending on the images printed in the first and second areas, respectively. According to the above-described configuration, the data corresponding to the second area and the data corresponding to the first area among the object image data are used so as to determine the correction level as the extent by which the density of the image in the second area is to be lowered in the second area processing. As a result, the printing apparatus is capable of printing the image in the second area with an appropriate or suitable density depending on the images of the first and second areas, respectively. Thus, the printing apparatus is capable of effectively suppressing the color unevenness occurring between the first and second areas.

According to a second aspect of the present disclosure, there is provided a printing apparatus including:

a head configured to discharge ink; and a controller, wherein the controller is configured to:

obtain an object image including a first partial image and a second partial image;

print a first overlap area and a nonoverlapping area, the first overlap area being included in the first partial image and overlapping with the second partial image, the first non-overlapping area being included in the first partial image and not overlapping with the second partial image; and correct density of the first overlapping area by reducing an usage amount of the ink in the first overlapping area, and the controller is configured to correct the density of the first overlapping area in a case that the first overlapping area and the first non-overlapping area satisfy a specific condition.

Note that the technique disclosed in the present specification can be realized in a various kinds of aspects; for example, the technique can be realized in aspects including: a printing apparatus; a method of controlling the printing apparatus, a print processing method; a computer program configured to realize the functions of these apparatuses and methods; a storage medium (for example, a non-volatile recording medium) storing the computer program therein; etc.

BRIEF DESCRIPTION OF THE DRAWINGS

FIGS. 12A and 12B are each a view for explaining color evaluating information.

FIG. 13 is a view explaining a modification.

DESCRIPTION OF THE EMBODIMENTS

First Embodiment

<Configuration of Printer 200>

Figure 1:
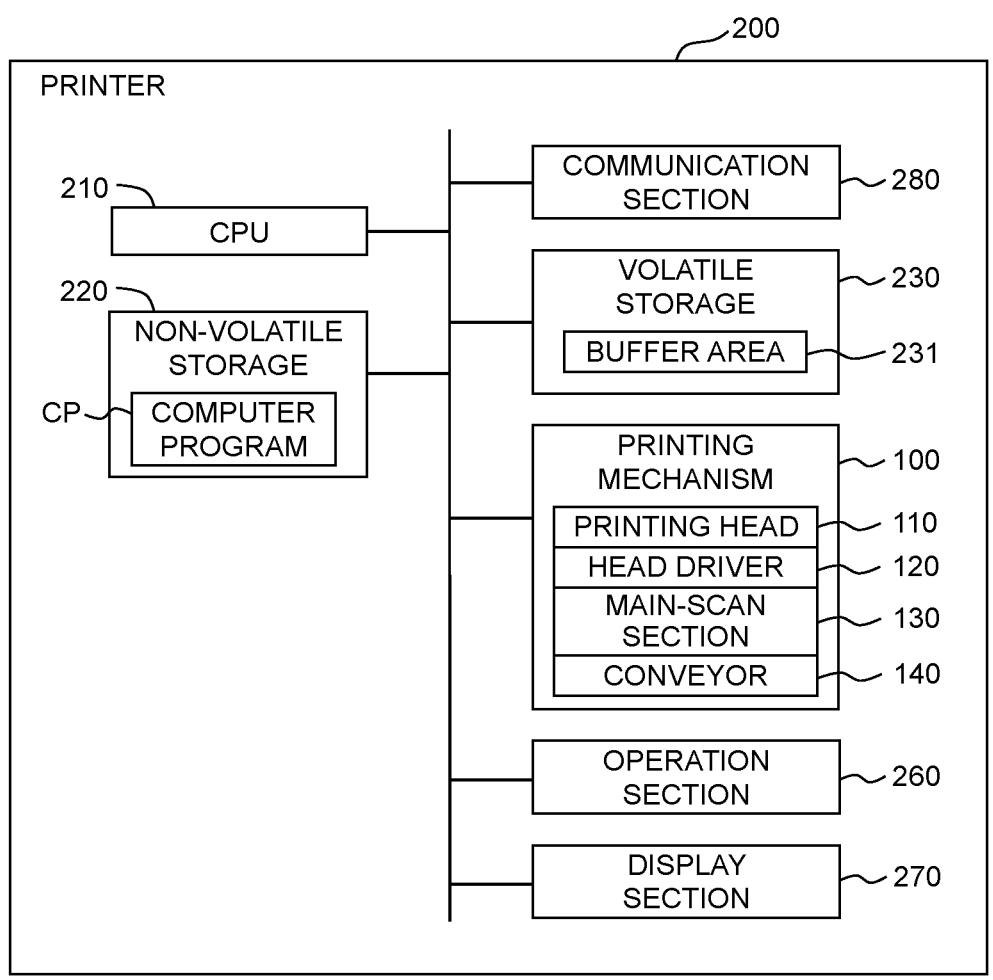
FIG. 1 is a block diagram indicating the configuration of a printer according to a first embodiment of the present disclosure.

Firstly, the configuration of a printer 200 will be explained, with reference to FIGS. 1, 2A and 2B.

A printer 200 includes, for example, a printing mechanism 100 as a print execution section, a CPU 210 as a controller for the printing mechanism 100, a non-volatile storage (memory unit) 220 such as a hard disk drive, etc., a volatile storage 230 such as a hard disk, a flash memory, etc., an operation section 260 such as a button, a touch panel, etc., via which an operation from a user is obtained, a display section 270 such as a liquid crystal display, etc., and a communication section 280. The printer 200 is connected to an external apparatus, such as a terminal apparatus (not depicted in the drawings) of a user, via the communication section 280 so that the printer 200 can communicate with the external apparatus.

The volatile storage 230 provides a buffer area 231 which temporarily stores a various kinds of intermediate data generated in a case that the CPU 210 performs a processing. A computer program CP is stored in the non-volatile storage 220. In the present embodiment, the computer program CP is a control program for controlling the printer 200. The computer program CP may be provided by being stored in the non-volatile storage 220 before shipment. Alternatively, the computer program CP may be provided in an aspect in which the computer program CP is downloaded from a server. Still alternatively, the computer program CP may be provided in an aspect in which the computer program CP is stored in a DVD-ROM, etc. The CPU 210 executes the computer program CP so as to, for example, control the printing mechanism 100, thereby executing a printing process (to be described later on).

The printing mechanism 100 performs printing by ejecting or discharging inks (liquid droplets) of respective colors which are cyan (C), magenta (M), yellow (Y), and black (K). The printing mechanism 100 includes a printing head 110, a head driving section 120, a main-scan section 130, and a conveyor 140.

Figure 2A:
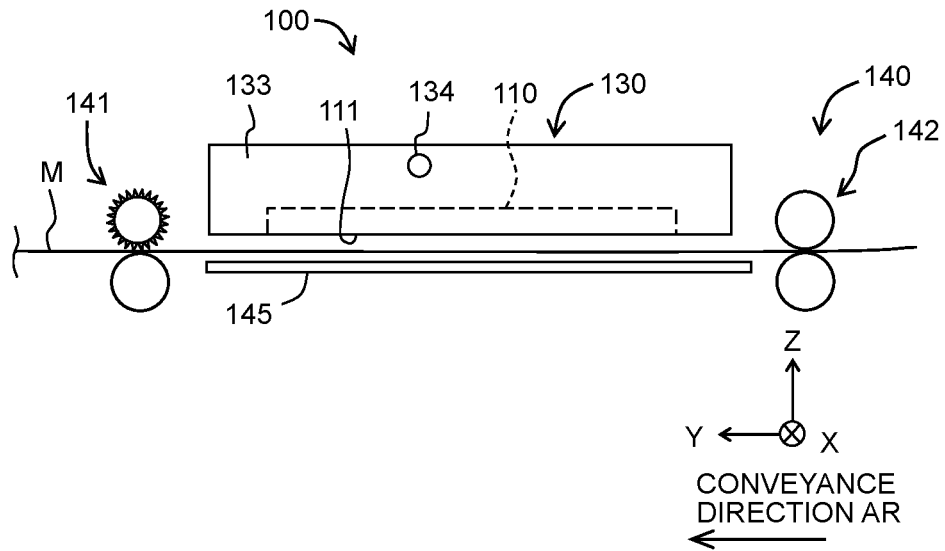
FIGS. 2A and 2B each depict the schematic configuration of a printing mechanism.

As depicted in FIG. 2A, the main-scan section 130 includes a carriage 133 having the printing head 110 mounted or installed therein and a sliding shaft 134 which holds the carriage 133 so that the carriage 133 can reciprocate in a main-scan direction (X axis direction in FIG. 2A). The main-scan section 130 uses power of a main scanning motor (not depicted in the drawings) to thereby cause the carriage 133 to reciprocate along the sliding shaft 134. This realizes main scanning in which the printing head 110 reciprocates in the main-scan direction with respect to the sheet M.

The conveyor 140 conveys the sheet M in a conveyance direction AR (+Y direction in FIGS. 2A and 2B) crossing the main-scan direction while holding the sheet M. In other words, the conveyor 140 moves the sheet M relative to the printing head 110 in the conveyance direction AR. As depicted in FIG. 2A, the printing mechanism 100 includes a sheet table 145, an upstream roller pair 142, and a downstream roller pair 141. In the following description, an upstream side (−Y side) in the conveyance direction AR is simply referred to as an upstream side in some cases, and a downstream side (+Y side) in the conveyance direction AR is simply referred to as a downstream side in some cases.

The upstream roller pair 142 holds the sheet M at the upstream side (−Y side) with respect to the printing head 110. The downstream roller pair 141 holds the sheet M at the downstream side (+Y side) with respect to the printing head 110. The printing table 145 is arranged at a location between the upstream roller pair 142 and the downstream roller pair 141 such that the printing table 145 faces or is opposite to a nozzle formation surface 111 of the printing head 110. The downstream roller pair 141 and the upstream roller pair 142 are driven by a conveyance motor (not depicted in the drawings) to thereby convey the sheet M.

The head driving section 120 (FIG. 1) supplies a driving signal to the printing head 110 while the main-scan section 130 performs the main scanning of the printing head 110, thereby driving the printing head 110. The printing head 110 forms dots by ejecting or discharging the ink on the sheet M, which is conveyed by the conveyor 140, in accordance with the driving signal.

Figure 2B:
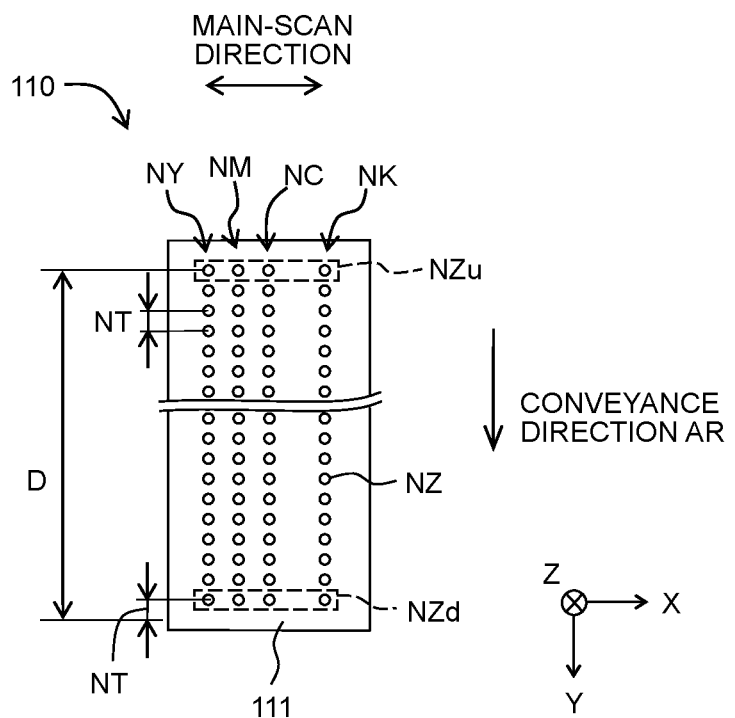

FIG. 2B depicts the configuration of the printing head 110 as being seen from a −Z side (lower side in FIG. 2A). As depicted in FIG. 2B, a plurality of nozzle rows or arrays formed of a plurality of nozzles, that is, a plurality of nozzle rows NC, NM, NY, NK from which the inks of C, M, Y, K are ejected or discharged, respectively, are formed in the nozzle formation surface 111 of the printing head 110. Each of the plurality of nozzle rows include a plurality of nozzle NZ which are aligned (arranged side by side) in the conveyance direction AR. The plurality of nozzles NZ have positions which are mutually different in the conveyance orientation AR (+Y direction); and the plurality of nozzles NZ are arranged side by side in the conveyance direction AR at a predefined nozzle interval NT therebetween. The nozzle interval NT is a length in the conveyance direction AR between two nozzles NZ which are included in the plurality of nozzles NZ and which are adjacent to each other in the conveyance direction AR. Among the plurality of nozzles NZ forming each of the plurality of nozzle rows, a nozzle NZ which is positioned at an upstream-most side (−Y side) is also referred to as an upstream-most nozzles NZu. Among the plurality of nozzles NZ forming each of the plurality of nozzle rows, a nozzle NZ which is positioned at the downstream-most side (+Y side) is also referred to as a downstream-most nozzle NZd. A length obtained by adding the nozzle interval NT to a length in the conveyance direction AR from the upstream-most nozzle NZu to the downstream-most nozzle NZd is also referred to as a nozzle length D.

The positions in the main-scan direction (X direction in FIG. 2B) of the nozzle rows NC, NM, NY, NK are different from one another; the positions in the conveyance direction AR (Y direction in FIG. 2B) of the nozzle rows NC, NM, NY, NK overlap with one another. In an example depicted in FIG. 2B, for example, the nozzle row NM is arranged in the +X direction with respect to the nozzle row NY from which Y ink is discharged.

<Printing Processing>

Next, a printing process will be explained with reference to FIG. 3. The CPU 210 (FIG. 1) of the printer 200 executes a printing process based on a printing instruction from a user. The printing instruction includes designation of image data which indicates an image to be printed. In step S110, the CPU 210 obtains image data designated by the printing instruction from the volatile storage 220. The image data to be obtained is image data having various formats such as a JPEG-compressed image data, image data described in a page-description language, etc.

In step S120, the CPU 210 executes a rasterization process with respect to the obtained image data to thereby generate RGB image data. The RGB image data is thus obtained as object image data of the present embodiment. The RGB image data is bitmap data in which a RGB value is included for each of pixels. The RGB value is, for example, a color value of a RGB color system which includes three component values that are red (R), green (G), and blue (B).

The CPU 210 executes, in step S130, a printing data output process by using the RGB image data. The printing data output process is a processing in which partial printing data is generated per one time of a partial printing SP (to be described later on), a variety of control data is added to the partial printing data, and then the partial printing data is outputted to the printing mechanism 100. The control data includes data designating a conveyance amount of sheet conveyance T to be executed after the partial printing SP. In the printing data output process, the partial printing data is output corresponding to a number of time(s) by which the partial printing SP is to be executed. The details of the printing data output process will be explained later on.

The CPU 210 is thus capable of causing the printing mechanism 100 to perform printing of a printing image PI. Specifically, the CPU 210 controls the head driving section 120, the main-scan section 130, and the conveyor 140 to alternately execute the partial printing SP and the sheet conveyance T repeatedly a plurality of times to thereby perform the printing. In one time of the partial printing SP, one time of the main scanning is performed in a state that the sheet M is stopped on the sheet table 145, and an ink is discharged from the nozzles NZ of the printing head 100 to the sheet M, thereby printing a part of the image to be printed on the sheet M. One time of the sheet conveyance T is a conveyance in which the sheet M is conveyed in the conveyance direction AR only by a predetermined conveyance amount. In the present embodiment, the CPU 210 causes the printing mechanism 100 to execute m times (m being an integer of not less than 2) of the partial printing SP.

Figure 4:
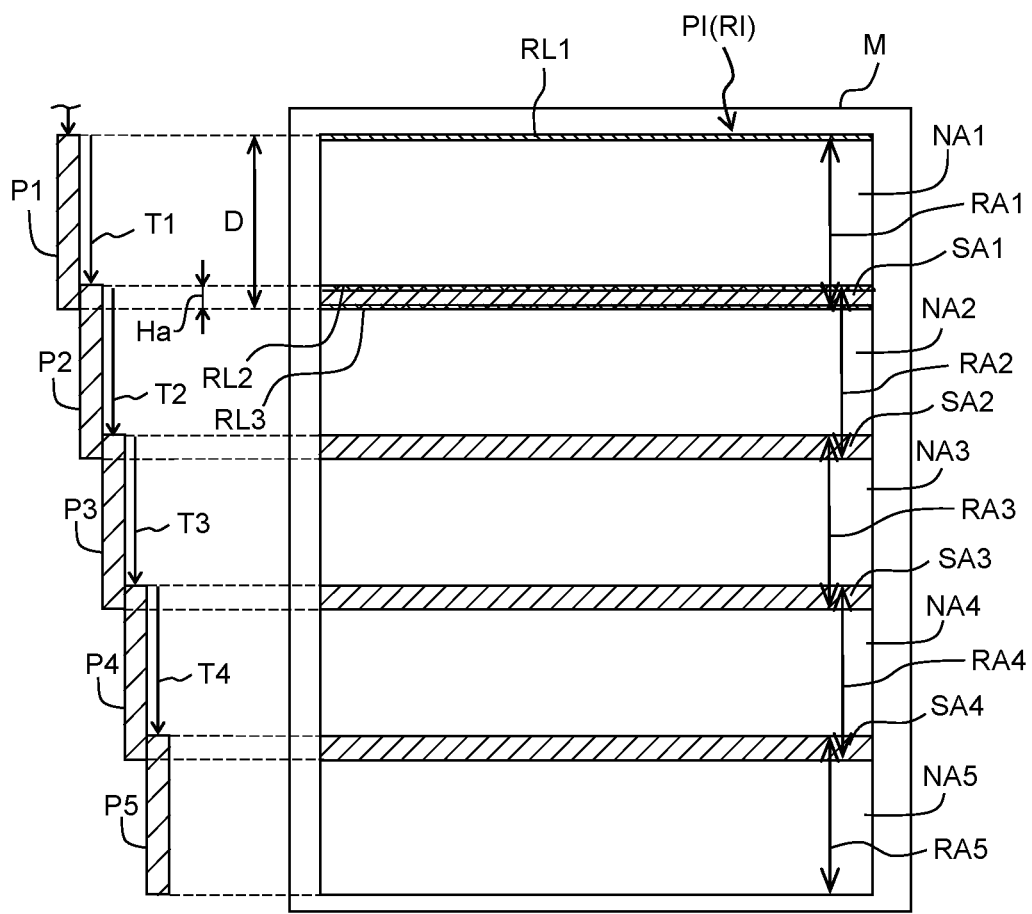
FIG. 4 depicts an example of a printing image to be printed on a sheet.

As depicted in FIG. 4, the printing image PI to be printed on the sheet M includes a plurality of raster lines RL (e.g., RL1 in FIG. 4) which extend in the X direction in FIG. 4 (the main-scan direction at the time of printing) and of which positions in the Y direction are mutually different. Each of the raster lines RL in the printing image PI is a line in which a plurality of dots may be formed in the X direction in FIG. 4. Each of the raster lines RL of the printing image PI corresponds on one-to-one basis to each of raster lines of an RGB image RI (to be described later on).

In the example depicted in FIG. 4, the printing image PI is printed by five times of the partial printing SP (m=5). Further, FIG. 4 depicts a head position P, namely, a relative position of the printing head 110 with respect to the sheet M is depicted per each of the partial printing SP (i.e., per each of main scannings). A pass number k (k being an integer in a range from not less than 1 to not more than "m") is assigned with respect to a plurality of times of the partial printing SP (the partial printing SP which are to be performed a plurality of times), in an execution order for executing the plurality of times of the partial printing SP; a k-th partial printing SP is also referred to as a partial printing SPk. Further, the head position P in a case that the k-th partial printing SPk is to be performed is referred to as a head position Pk. Furthermore, the sheet conveyance T performed between the k-th partial printing SPk and a (k+1)-th partial printing SP(k+1) is also referred to as a k-th sheet conveyance Tk. FIG. 4 depicts head positions P1 to P5 corresponding, respectively, to first to fifth partial printings SP as well as sheet conveyances T1 to T5.

Note that in FIG. 4, the printing image PI formed on the sheet M includes a plurality of non-overlap areas NA (for example, areas NA1 to NA5 which are non-hatched areas in FIG. 4) and a plurality of overlap areas SA (for example, areas SA1 to SA4 which are hatched areas in FIG. 4).

Each of the plurality of non-overlap areas NA is an area in which each of the respective raster lines RL within the area is printed only by one time of partial printing (partial printing performed once). For example, in each of the raster lines RL in a non-overlap area NAk in FIG. 4, the dots are formed only by the k-th partial printing SPk, namely, only by the partial printing SPk performed at the head position Pk. In each of the raster lines RL in the non-overlap area NAk, the dots are not formed by the (k+1)-th partial printing SP(k+1) or by a (k−1)-th partial printing SP (k−1). Accordingly, the dots of the specified color, for example, dots of C of each of the raster lines RL in the non-overlap area NAk are formed by one nozzle included in the nozzles forming the nozzle row NC and corresponding to said raster line RL.

Each of the plurality of overlap areas SA is an area in which each of the respective raster lines RL within the area is printed by two times of partial printing (partial printing performed twice). For example, in each of the raster lines RL in the overlap area SAk in FIG. 4, the dots are formed by the k-th partial printing SPk and the (k+1)-th partial printing SP (k+1). Namely, in each of the raster lines RL in the overlap area SAk, the dots are formed by the partial printing SPk performed at the head position PK, and by the partial printing SP performed at the head position P(k+1). Accordingly, the dots of the specified color, for example, dots of C of the raster line RL in each of the overlap areas SAk are formed by two nozzles included in the nozzles forming the nozzle row NC and corresponding to said raster line RL. The two nozzles corresponding to the raster line RL in the overlap area SAk are a nozzle corresponding to said raster line RL in the partial printing SPk and a nozzle corresponding to the raster line RL in the partial printing SP(k+1).

The overlap area SAk is positioned between the non-overlap area NAk and the non-overlap area NA(k+1). A length HA in the conveyance direction of the overlap area SA is a length corresponding, for example, to about a several pieces of the raster line RL to about several dozen pieces of the raster line RL.

Note that as depicted in FIG. 4, a partial area RA1 which is printable by a partial printing SP1 performed first (first partial printing SP1) includes an overlap area SA1 including an upstream end of the partial area RA1 and a non-overlap area NA1 which is on the downstream side of the overlap area SA1. Partial areas RA2 to RA4 which are printable by partial printing SP2 to SP4 performed second to fourth (second to fourth partial printings SP2 to SP4), respectively, each includes: an overlap area SAk including an upstream end of a partial area RAk, an overlap area SA(k−1) including a downstream end of the partial area RAk, and a non-overlap area NAk located on the downstream side of the overlap are SAk and on the upstream side of the overlap area SA(k−1) (k being any one of 2 to 4). A partial area RA5 which is printable by a partial printing SP performed last (last partial printing SP) includes the overlap are SA4 including a downstream end of the partial rea RA5, and the non-overlap area NA5 located on the upstream side of the overlap area SA4.

The reason for providing the overlap areas SA is explained below. It is assumed that a printing image is formed only by images printed in the non-overlap areas, without providing the overlap areas SA. In this case, an inconvenience which is referred to as a so-called banding such as a white streak and/or a black streak might be caused at a boundary between two non-overlap areas adjacent to each other in the conveyance direction AR, due to any variation in the conveyance amount of the sheet M, etc. The banding lowers the image quality of the printing image PI. By providing the overlap area SA between two pieces of the non-overlap area NA and by printing the image on the overlap area SA, it is possible to suppress the occurrence of the inconvenience referred to as the banding as described above. Since the dots on one raster line RL in the overlap area SA are formed by the partial printing performed twice, it is possible to suppress such a situation that all the dots on a certain one raster line RL are deviated uniformly with respect to all the dots on another raster line different from the certain raster line.

<Print data Outputting Processing>

Next, the printing data output process in step S130 of FIG. 3 will be explained. As described above, the printing data output process is a processing of generating the partial printing data per each of (one time of) the partial printing SP by using the RGB image data, of adding the variety of control data to the partial printing data, and then of outputting the partial printing data to the printing mechanism 100.

An RGB image RI indicated by the RGB image data which is an object of the color conversion process corresponds to the printing image PI of FIG. 4. Accordingly, FIG. 4 can be also referred to as a view indicating the RGB image RI. The RGB image PI includes the plurality of raster lines RL (e.g., RL1 in FIG. 4) which extend in the X-direction of FIG. 4 (a direction corresponding to the main-scan direction at the time of printing) and of which positions in the Y direction are mutually different. Each of the raster lines RL is a line extending in the X-direction of FIG. 4, and is constructed of a plurality of pixels. Each of the raster lines RL, in which a plurality of dots are formed, of the printing image PI corresponds on one-to-one basis to each of the raster lines RL, which are formed of the pixels, of the RGB image RI, as described above. Accordingly, in the present specification and drawings, the raster lines of the printing image PI and the raster lines of the RGB images are denoted by same reference numerals. Further, in the RGB image RI, areas corresponding to the overlap area SA, the non-overlap area NA, the partial area RA, respectively, of the printing image PI as described above are referred to as the overlap area SA, the non-overlap area NA, the partial area RA of the RGB image RI. In the RGB image RI, a direction corresponding to the conveyance direction AR in the printing image PI is referred to as a conveyance direction AR in the RGB image RI.

In step S200, the CPU 210 selects, for example, one target raster line (interest raster line) among the plurality of raster lines RL in the RGB image RI, sequentially from the downstream side in the conveyance direction AR at the time of printing (+Y side in FIG. 4). For example, a first target raster line is the raster line R1 in FIG. 4.

Here, the partial printing SP by which the target raster line is printed is also referred to as a target partial printing (interest partial printing). Note that in a case that the target raster line is to be printed by two times of the partial printing SP, namely, in a case that the target raster line is positioned within the overlap area SA, a partial printing included in the two times of the partial printing and which is executed first is defined as the target partial printing. For example, in a case that the raster lines RL1 to RL3 are each the target raster line, the target partial printing is the partial printing SP1 which is performed at the head position P1 (FIG. 4). Namely, the partial printing SP1 which is performed at the head position P1 (FIG. 4) includes a plurality of raster lines each of which includes a plurality of dots aligned along the X direction of FIG. 4. The plurality of raster lines include the raster lines RL1 to RL3. The raster line RL1 is included in the non-overlap area NA of the partial printing SP1 which is performed at the head position P1 (FIG. 4). A plurality of dots constructing the raster line RL1 are formed by using one piece of the nozzle (one nozzle) corresponding to the raster line RL1. Further, the raster lines RL2 and RL3 are included within the overlap area SA of the partial printing SP1 which is performed at the head position P1 (FIG. 4). A plurality of dots constructing each of the raster lines RL2 and RL3 are formed by using not less than 2 pieces of the nozzle (not less than two nozzles) corresponding to each of the raster lines RL2 and RL3, respectively.

In step S210, the CPU 210 determines whether or not the target raster line is positioned within the overlap are SA. For example, in a case that the raster lines RL2 and RL3 of FIG. 4 are each the target raster line, the CPU 210 determines that the target raster line is positioned within the overlap area SA.

In a case that the target raster line is not positioned within the overlap area SA (step S210: NO), namely, in a case that the target raster line is positioned within the non-overlap area NA, the CPU 210 executes, in step S222 and in step S224, a dot data generating process for non-overlap area (non-overlap area-dot data generating process).

In step S222, the CPU 210 executes the color conversion process with respect to data included in the RGB image data and corresponding to the target raster line. The color conversion process is a processing of converting the RGB values of a plurality of pixels constructing the target raster line to the CMYK values, respectively. The CMYK values are color values of the CMYK color system including component values corresponding to the ink(s) which is (are) to be used in the printing (in the present embodiment, the component values of C, M, Y and K). The color conversion process is executed, for example, by referring to a publicly known look-up table defining the corresponding relationship between the RGB values and the CYMK values.

In step S224, the CPU 210 executes a halftone process with respect to the data corresponding to the target raster line for which the color conversion process has been executed. With this, dot data corresponding to the target raster line is generated. The dot data is data indicating a dot formation state for each of the pixels, with respect to each of the respective color components of CMYK. The value of each of the pixels in the dot data indicates, for example, a dot formation state of two gradations which are "no dot" and "with dot", or a dot formation state of four gradations which are "no dot", "small dot", "medium dot", and "large dot". The halftone process is executed by using a publicly known method such as the dithering method, the error diffusion method, etc.

In a case that the target raster line is not positioned within the overlap area SA, the dots corresponding to the plurality of pixels included in the target raster line should be all printed by the target partial printing. For this reason, in step S225, the CPU 210 stores the dot data for the target raster line which has been generated in an output buffer.

In a case that the target raster line is positioned within the overlap area SA (step S210: YES), the CPU 210 determines, in step S211, whether or not the target raster line is a head (leading) raster line in the overlap area SA. The head raster line in the overlap area SA is a raster line, among the plurality of raster lines included in the overlap area SA, which is positioned at the downstream in the conveyance direction AR (an upper end in FIG. 4). For example, the raster line RL2 is a head raster line in the overlap area SA1.

In a case that the target raster line is the head raster line of the overlap area SA (step S211: YES), the CPU 210 executes a processing of determining density correction (density correction determining process) in step S212. The density correction determining process is a processing of determining as to whether or not a correction of lowering the density is to be executed in a dot data generating process for overlap are (overlap area-dot data generating process) (to be described later on).

Figure 6A:
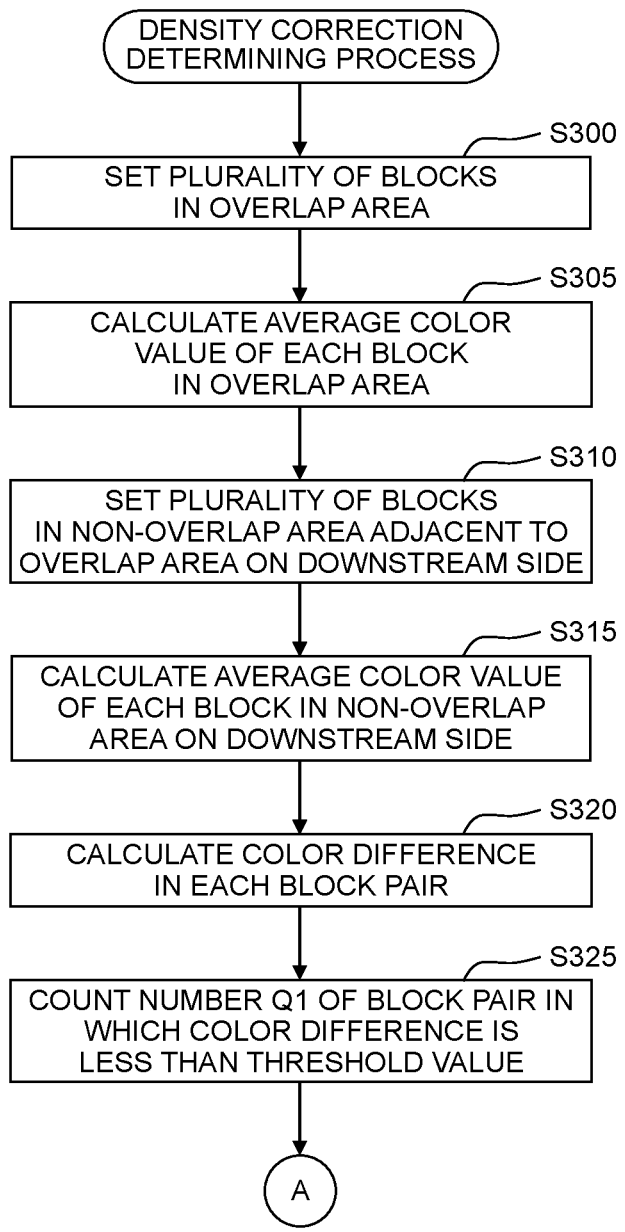
FIGS. 6A and 6B depict a flowchart of a density correction determining process of the first embodiment.

The density correction determining process of the first embodiment will be explained with reference to FIGS. 6A and 6B. In step S300, the CPU 210 sets a plurality of blocks BLs in an overlap area SA at which the target raster line is located. FIG. 7 is an enlarged view of a part, of the RGB image RI, in the vicinity of the overlap area SA1. In a case that the target raster line is located at the overlap area SA1, the plurality of blocks BLs are set in the overlap area SA as depicted in FIG. 7. For example, the overlap area SA1 of FIG. 7 is divided into 10 pieces of a rectangular bock BLs which are arranged side by side in the main-scan direction (X direction). For example, a height BH in the conveyance direction AR of the block BLs is equal to the length Ha in the conveyance direction AR of the overlap area SA1, and a length BW in the main-scan direction of the block BLs is a length which is determined in advance.

In step S305, the CPU 210 calculates an average color value of each of the blocks BLs in the overlap area SA. In the example depicted in FIG. 7, the CPU 210 calculates, with respect to each of 10 pieces of the block BLs, an average RGB value of all the pixels in the block BLs, as the average color value.

In step S310, the CPU 210 sets a plurality of pieces of a block BLn1 in a non-overlap area NA which is adjacent to the overlap area SA on the downstream side in the conveyance direction AR. In the example depicted in FIG. 7, a plurality of pieces of the block BLn1 are set in the non-overlap area NA1 on the downstream side (+Y side) of the overlap area SA. Each of the plurality of blocks BLn1 of FIG. 7 is a block of which size is same as that of one of the blocks BLs in the overlap area SA, and are arranged along an upstream end (end on the −Y side) of the non-overlap area NA1.

In step S315, the CPU 210 calculates an average color value of each of the blocks BLn1 in the non-overlap area NA1. Similarly to the average color value of the blocks BLs in the overlap area SA as described above, the CPU 210 calculates, with respect to each of the block BLn1, an average RGB value of all the pixels in each of the blocks BLn1, as the average color value.

In step S320, the CPU 210 calculates a color difference $\Delta C1$ between each block pair BP1. As depicted in FIG. 7, the block pair BP1 is a pair constructed of one piece of the block BLs and one piece of the block BLn1 which is adjacent to the one piece of the block BLs on the downstream side of the conveyance direction AR. In the example depicted in FIG. 7, the CPU 210 calculates the color difference $\Delta C1$ of each of 10 sets of the block pair BP1.

For example, the color difference $\Delta C1$ is a Euclid distance between the average color value $(Rs, Gs, Bs)$ of the blocks BLs constructing the block pair BP1 and the average color value $(R1, G1, B1)$ of the blocks BLn1, and is represented by the following formula (1):

$$\Delta C1 = \mathrm{SQRT}[(Rs-R1)^2 + (Gs-G1)^2 + (Bs-B1)^2] \qquad (1)$$

Note that SQRT[V] means the square root of V. In order to reduce the calculation amount, the square of the color difference ΔC1 may be used, instead of the color difference ΔC1. Further, the color difference ΔC1 may be calculated by using a color system which is different from the RGB color system, such as, for example, the CIELAB color system, CIELUV color system, etc.

In step S325, the CPU 210 counts a quantity Q1 of a block pair BP1, among the block pairs BP1, of which color difference ΔC1 is less than a predetermined threshold value TH1. In step S330, the CPU 210 determines whether or not the quantity Q1 is not less than a threshold value TH2. Namely, there is a first block which is one of blocks obtained by dividing the overlap area SA in the direction crossing the conveying direction AR, and a second block which is one of blocks obtained by dividing the non-overlap area NA in the direction crossing the conveying direction AR and which is adjacent to the first block in the conveying direction AR. The CPU 210 determines whether or not the color difference between the color of the first block and the color of the second block is not less than the threshold value.

In a case that the quantity Q1 is less than the threshold value TH2 (step S330: NO), then in step S335, the CPU 210 sets a plurality of pieces of a block BLn2 in a non-overlap area NA which is adjacent to the overlap area SA on the upstream side in the conveyance direction AR. In the example depicted in FIG. 7, a plurality of pieces of the block BLn2 are set in the non-overlap area NA2 on the upstream side (−Y side) of the overlap area SA1. Each of the plurality of blocks BLn2 of FIG. 7 is a block of which size is same as that of one of the blocks BLs in the overlap area SA1, and are arranged along a downstream end (end on the +Y side) of the non-overlap area NA2.

In step S340, the CPU 210 calculates an average color value of each of the blocks BLn2 in the non-overlap area NA2. Similarly to the average color value of the blocks BLs in the overlap area SA as described above, the CPU 210 calculates, with respect to each of the block BLn2, an average RGB value of all the pixels in each of the blocks BLn2, as the average color value.

In step S345, the CPU 320 calculates a color difference ΔC2 between each block pair BP2. As depicted in FIG. 7, the block pair BP2 is a pair constructed of one piece of the block BLs and one piece of the block BLn2 which is adjacent to the one piece of the block BLs on the upstream side of the conveyance direction AR. In the example depicted in FIG. 7, the CPU 210 calculates the color difference ΔC2 of each of 10 sets of the block pair BP2. For example, the color difference ΔC2 is a Euclid distance between the average color value of the blocks BLs and the average color value of the blocks BLn2 constructing the block pair BP2. Note that in order to reduce the calculation amount, the square of the color difference ΔC1 and the square of the color difference ΔC2 may be used, instead of the color difference ΔC1 and the color difference ΔC2.

In step S350, the CPU 210 counts a quantity Q2 of a block pair BP2, among the block pairs BP2, of which color difference ΔC2 is less than the predetermined threshold value TH1. In step S355, the CPU 210 determines whether or not the quantity Q2 is not less than the threshold value TH2.

In a case that the quantity Q1 is not less than the threshold value TH2 (step S330: YES), and that the quantity Q2 is not less than the threshold value TH2 (step S355: YES), then in step S360, the CPU 210 determine that the density correction is to be executed. Namely, the CPU 210 performs the correction in a case that the color difference between the color of the first block and the color of the second block is equal to or more than a second threshold value.

In a case that the quantity Q2 is less than the threshold value TH2 (step S355: NO), then in step S365, the CPU 210 determines that the density correction is not to be executed. Namely, the CP 210 determines the correction level based on the partial image data of the overlap area SA including the color value of the RGB color system which includes three component values that are red (R), green (G), and blue (B) with respect to each of the pixels, and based on the RGB image data of the non-overlap area NA including the color value of the RGB color system which includes three component values that are red (R), green (G), and blue (B) with respect to each of the pixels. In other words, the CPU 210 obtains the value indicating the extent by which any color unevenness is conspicuous, with respect to each of the pixels.

Figure 5:
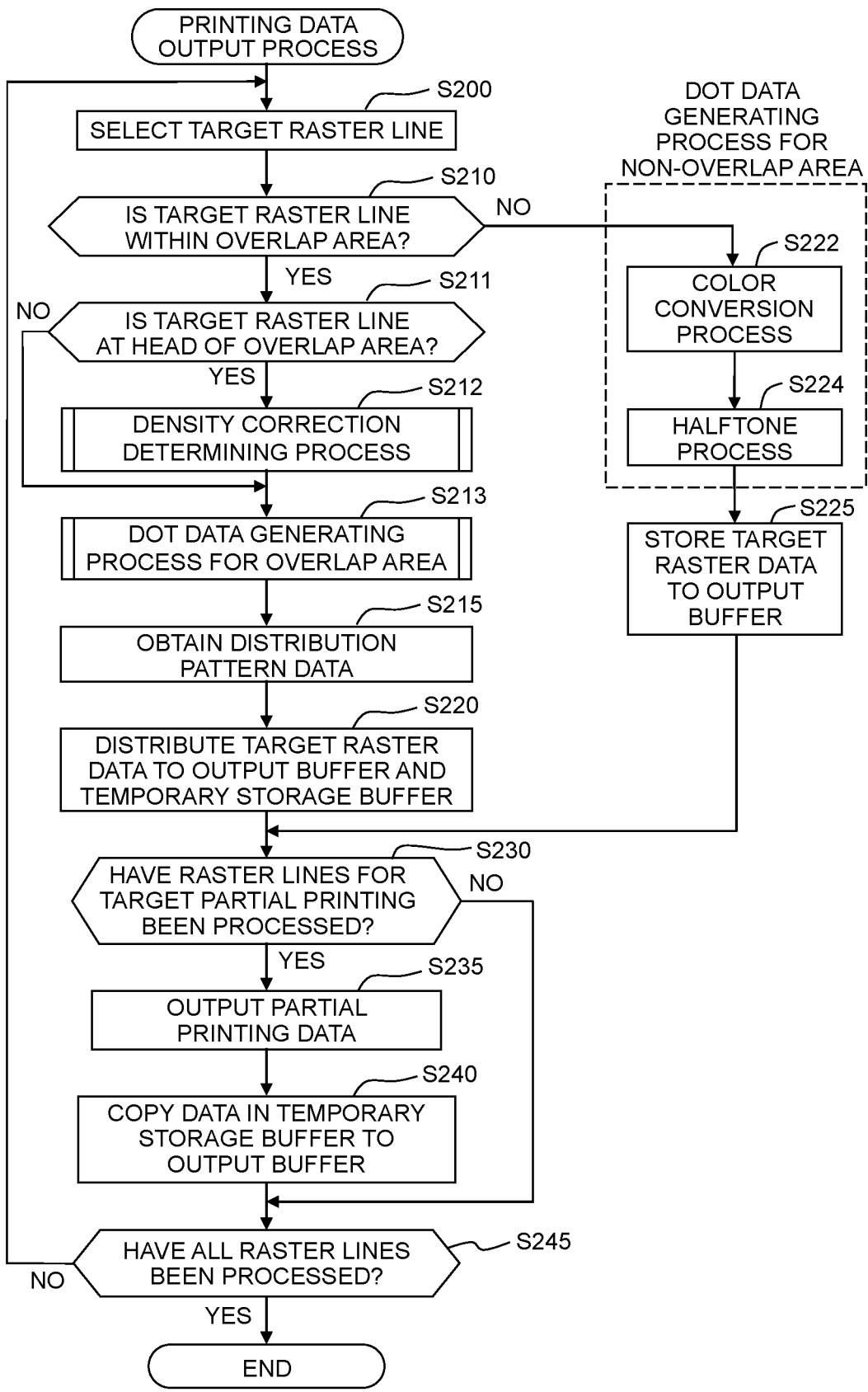
FIG. 5 is a flowchart of a data outputting processing.

In a case that the CPU 210 ends the density correction determining process, in step S213 of FIG. 5, the CPU 210 executes the dot data generating process for overlap are (overlap area dot data-generating processing). The overlap area-dot data generating process will be explained with reference to FIG. 8.

Figure 8:
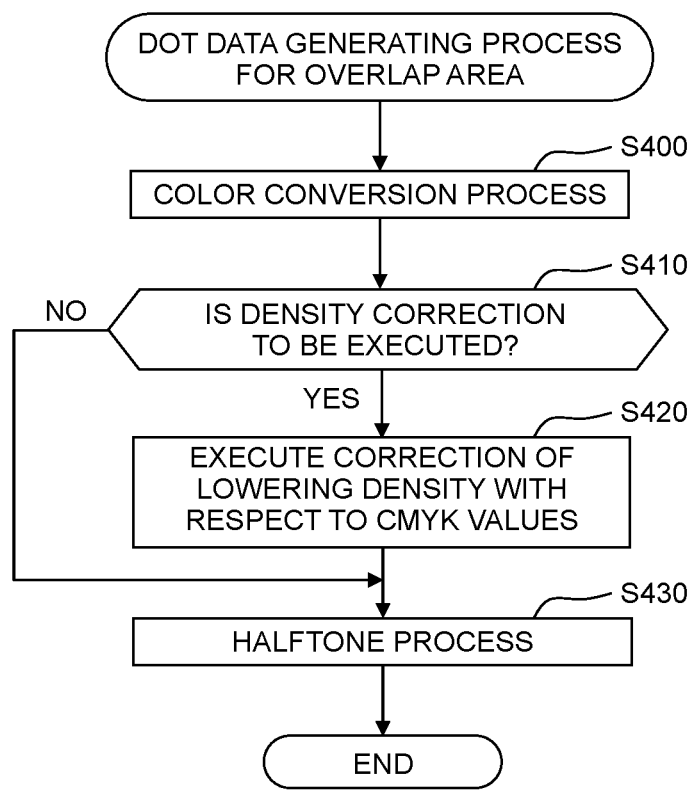
FIG. 8 is a flowchart of a dot data generating process for an overlap area.

In step S400 of FIG. 8, the CPU 210 executes the color conversion process with respect to data which is included in the RGB data and which corresponds to the target raster line. With this, the values of the plurality of pixels constructing the target raster line are converted from the RGB values to the CMYK values, respectively. Namely, the CPU 210 converts a color value of the RGB color system which includes three component values that are red (R), green (G), and blue (B) into a color value of the CMYK color system including not less than one component corresponding to not less than one ink to be used in the printing by the printing mechanism 100, to thereby generate converted partial image data of the overlap area SA (converted partial image data of the overlap area SA for which the conversion has been performed).

In step S410, the CPU 210 determines whether or not the density correction is to be executed. In a case that it is determined, with respect to the overlap area SA in which the target raster line is located, that the density correction is to be executed in the density correction determining process in step S212, the CPU 210 determines that the density correction is to be executed; on the other hand, in a case that it is determined, with respect to the overlap area SA in which the target raster line is located, that the density correction is not to be executed in the density correction determining process in step S212, the CPU 210 determines that the density correction is not to be executed.

In a case that the CPU 210 determines that the density correction is to be executed (step S410: YES), then in step S420, the CPU 210 executes a correction of lowering the density, with respect to the CMYK values of the plurality of pixels constructing the target raster line. Specifically, values which are obtained by multiplying the respective values of C, M, Y and K by a predetermined coefficient a are defined as corrected values of the respective components (respective corrected component values). The coefficient a is a value which is greater than 0 (zero) and smaller than 1 (one), and is, for example, 0.9. Note that the CPU 210 may correct at least one component value among the respective components which are C, M, Y and K of each of the pixels included in the converted partial image data of the overlap area SA. In a case that the CPU 210 determines that the density correction is not to be executed (step S410: NO), the CPU 210 skips step S420.

In step S430, the CPU 210 executes a halftone process with respect to the CMYK values of the plurality of pixels constructing the target raster line. With this, dot data relating to (corresponding to) the target raster line is generated. Namely, the CPU 210 executes the halftone process with respect to the corrected partial image data of the overlap area SA to thereby generate the dot data of the overlap area SA.

Figure 9A:
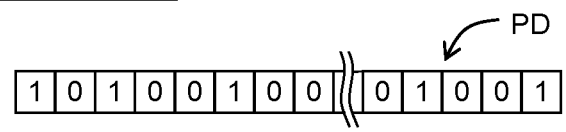
FIG. 9A is a view depicting distribution pattern data.
Figure 9B:
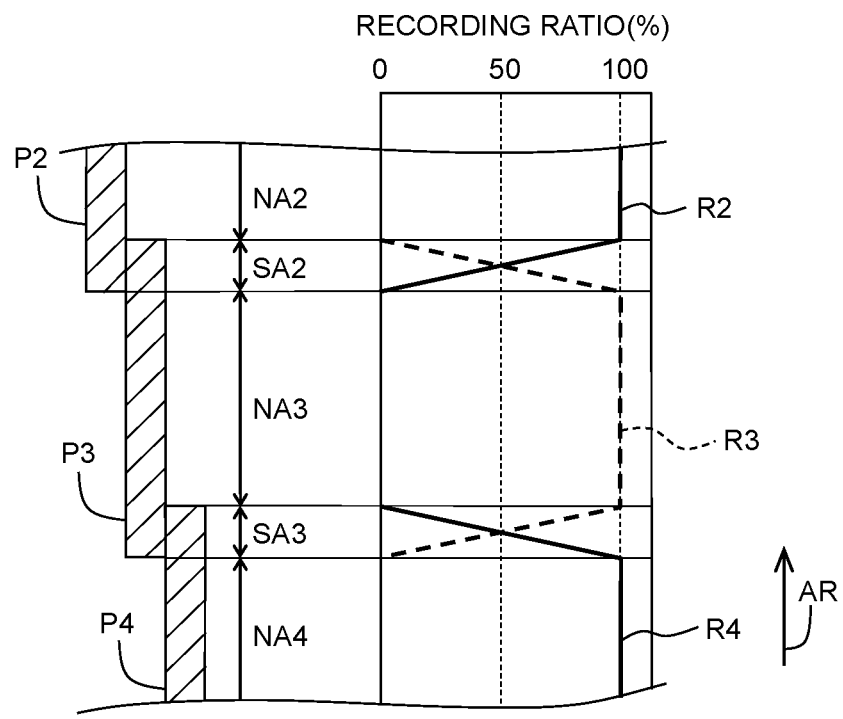
FIG. 9B is a view depicting recording ratios at head positions P2 to P4, respectively.

In step S215 of FIG. 5, the CPU 210 obtains distribution pattern data PD corresponding to the target raster line. FIG. 9A is a view depicting the distribution pattern data PD, and FIG. 9B is a view depicting recording ratios of partial printings in head positions P2 to P4, respectively. As depicted in FIG. 9A, the distribution pattern data PD is binary data having values corresponding to the pixels, respectively, of the target raster line. A value "0 (zero)" of the distribution pattern data PD indicates that a dot corresponding to a certain pixel is to be formed in the target partial printing. A value "1 (one)" of the distribution pattern data PD indicates that the dot corresponding to the certain pixel is to be formed in a partial printing which is to be executed next to the target partial printing.

Here, the recording ratios R2, R3 and R4 in FIG. 9B are recording ratios of the partial printings SP2, SP3 and SP4 at the head positions P2, P3 and P4, respectively. FIG. 9B indicates the respective recording ratios R2, R3 and R4 with respect to positions in the conveyance direction AR, respectively. In a range in the conveyance direction AR corresponding to the non-overlap area NA2 (FIG. 4), the recording ratio R2 is 100%. Similarly, in ranges in the conveyance direction AR corresponding to the non-overlap areas NA3 and NA4 (FIG. 4), respectively, the recording ratios R3 and R4 are each 100%.

In a range in the conveyance direction AR corresponding to the overlap area SA2 (FIG. 4), the recording ratio R2 is linearly reduced toward the upstream side (the lower side in FIG. 9B) of the conveyance direction AR. In the range in the conveyance direction AR corresponding to the overlap area SA2, the recording ratio R3 is linearly reduced toward the downstream side (the upper side in FIG. 9B) of the conveyance direction AR. In the range in the conveyance direction AR corresponding to the overlap area SA2 (FIG. 4), a sum of the recording ratio R2 and the recording ratio R3 is 100%. This is similarly applicable also to the recording ratios R3 and R4 in ranges in the conveyance direction AR corresponding to the overlap areas SA3 and SA4 (FIG. 4), respectively.

Note that although FIG. 9B depicts the recording ratios regarding only the partial printings in the head positions P2 to P4, the recording ratios are similar to those as described above, also in the head positions P1 and P5 which are different from the head positions P2 to P4. With this, it is possible to perform printing at the recording ratio of 100% in each of the non-overlap areas NA1 to NA5 and in each of the overlap areas SA1 to SA4.

The distribution pattern data PD is generated so that the above-described recording ratio(s) is (are) realized depending on the position(s) in the conveyance direction AR in the overlap area SA.

In step S220, the CPU 210 stores the dot data relating to the target raster line in an output buffer and a primary storage buffer (temporary storage buffer), in a dividing manner, in accordance with the distribution pattern data PD. Namely, among the dot data relating to the target raster line, dot data indicating dots to be formed in the target partial printing is stored in the output buffer, and data indicating dots to be formed in the partial printing which is to be performed next to the target partial printing is stored in the temporary storage buffer, in accordance with the distribution pattern data PD.

In step S230, the CPU 210 determines whether or not all the raster lines relating to the target partial printing have been processed as the target raster line. For example, in a case that the partial printing SP1 which is to be performed at the head position P1 in FIG. 4 is the target partial printing and that the raster line RL3 which is located at the upstream-most side in the conveyance direction AR among the plurality of raster lines RL corresponding to the head position P1 is the target raster line, the CPU 210 determines that all the raster lines relating to the target partial printing have been processed.

In a case that the CPU 210 determines that all the raster lines relating to the target partial printing have been processed (step S230: YES), the dot data relating to the target partial printing has been stored in the output buffer, at this point of time. Accordingly, in this case, the CPU 210 outputs, in step S235, the dot data relating to the target partial printing to the printing mechanism 100 as the partial printing data. In this situation, control data indicating a conveyance amount of sheet conveyance T which is to be performed after the target partial printing is added to the partial printing data which is to be outputted. For example, there is assumed such a case that the target partial printing is the first partial printing SP1. In such a case, the length in the conveyance direction AR of the overlap area SA1 on the upstream side of the partial area RA 1 which is to be printed by the partial printing SP1 is Ha (FIG. 4). Accordingly, the conveyance amount of the sheet conveyance T which is to be performed after the target partial printing is defined as a value obtained by subtracting the length Ha from the nozzle length D (D-Ha).

In step S240, the CPU 210 erases the outputted partial printing data from the output buffer, and copies the data stored in the temporary buffer to the output buffer. For example, at a point of time when the last raster line corresponding to the head position P1 of FIG. 4 has been processed, raster lines which are included in the plurality of raster lines corresponding to the head position P2 and which are in the overlap area SA have been already processed. Further, among the raster data corresponding to the processed raster lines, the data which is to be used in the partial printing at the head position P2 has been already stored in the temporary storage buffer. In step S240, the CPU 210 copies these data in the output buffer.

In a case that there is any un-processed raster line relating to the target partial printing (step S230: NO), the CPU 210 skips steps S235 and 5240.

In step S245, the CPU 210 determines whether or not all the raster lines in the RGB image RI have been processed as the target raster line(s). In a case that there is any unprocessed raster line (step S245: NO), the CPU 210 returns to step S200 and selects the un-processed raster line as the target raster line. In a case that all the raster lines have been processed (step S245: YES), the CPU 210 ends the printing data output process.

According to the first embodiment as explained above, the CPU 210 obtains the RGB image data as the object image data (step S110 in FIG. 3), and generates the dot data by using the RGB image data (steps S222, S224 and step S213 in FIG. 5). The CPU 210 uses the dot data so as to cause the printing mechanism 100 to execute the discharge of the ink and the conveyance of the sheet M to thereby print the printing image PI (step S235 of FIG. 5). As explained with reference to FIG. 4, the dots of the specified color (for example, the dots of C) constructing each of the plurality of raster lines RL included in the non-overlap area NA of the printing image PI are formed by using one piece of the nozzle corresponding to the raster line RL. The dots of the specified color constructing each of the plurality of raster line RL included in the overlap area SA of the printing image PI are formed by using not less than two pieces of the nozzle corresponding to the raster line RL.

The CPU 210 executes the non-overlap area-dot data generating process (steps S222 and S224 of FIG. 5) with respect to the partial image data which is included in the RGB image data and which corresponds to the non-overlap area NA, and generates the dot data which is included in the dot data indicating the printing image PI and which corresponds to the non-overlap area NA. The CPU 210 executes the overlap area-dot data generating process (step S213 of FIG. 5, FIG. 8) with respect to the partial image data which is included in the RGB image data and which corresponds to the overlap area SA, and generates the dot data which is included in the dot data indicating the printing image PI and which corresponds to the overlap area SA. There is such a case that the correction for lowering the density (step S420 of FIG. 8) is executed in the overlap area-dot data generating process. Accordingly, the overlap area-dot data generating process can be expressed as a processing of generating the dot data corresponding to the overlap area SA so that an image in the overlap area SA is to be printed with a density not more than a density with which the image in the overlap area SA is to be printed in a presumed case that the non-overlap area-dot generating processing is to be executed with respect to the partial image data corresponding to the overlap area SA. In the density correction determining process (step S212 of FIG. 5, FIGS. 6A and 6B), the CPU 210 uses the partial image data included in the RGB image and corresponding to the overlap area SA (for example, SA1 in FIG. 7) and the partial image data included in the RGB image and corresponding to the non-overlap area NA adjacent to the overlap area SA (for example, NA1, NA2 in FIG. 7) to thereby determine a correction level as an extent by which the density of the image is lowered in the overlap area SA in the overlap area-dot data generating process (FIGS. 6A and 6B). In the present embodiment, as described above, the correction level is a two-steps level as to execute or not execute the density correction (step S360, step S365 of FIG. 6B). The CPU 210 executes the overlap area-dot data generating process based on the correction level determined in the density correction determining process (steps S410, S420 of FIG. 8).

In the overlap area SA in which the plurality of dots of the specified color (for example, dots of C) on one raster line RL are formed by using not less than two nozzles, there is a time-lag since a certain dot has been formed by one of the not less than two nozzles and until another dot is formed by another of the not less than two nozzles. Thus, the certain dot formed by the one nozzle spreads on the printing medium, and then the another dot is formed by another nozzle so as to overlap with the certain dot. Therefore, the total area of the dot in the overlap area SA tends to be greater than the total area of the dot in the non-overlap area NA. Thus, even in a case that images are formed by using same image data, the density of the image formed in the overlap area SA tends to be higher than the density of the image formed in the non-overlap area NA. Due to this, any unevenness in color might occur between the overlap area SA and the non-overlap area NA in the printing image PI. The extent by which such a color unevenness is conspicuous between the overlap area SA and the non-overlap area NA is different depending on the images printed in the overlap area SA and the non-overlap area NA, respectively. According to the above-described configuration, the partial image data corresponding to the overlap area SA and the partial image data corresponding to the non-overlap area NA among the RGB data are used so as to determine the correction level as the extent by which the density of the image in the overlap area SA is to be lowered in the overlap area-dot data generating process. Namely, the CPU 210 performs the correction based on the color of the non-overlap area NA and the color of the overlap area SA. As a result, the printer 200 is capable of printing the image in the overlap area SA with an appropriate or suitable density depending on the images of the overlap area SA and the non-overlap area NA, respectively. Thus, the printer 200 is capable of effectively suppressing the color unevenness occurring between the overlap area SA and the non-overlap area NA. Further, in a case that the correction for lowering the density is performed, there is such a possibility that the color of a corrected image tends to become a color different from the color which should be originally expressed. Furthermore, in the case that the correction for lowering the density is performed, there is such a possibility that the corrected color might be excessively lighter, depending on the sheet M, etc., than a corrected color anticipated. Accordingly, it is preferred that the level of the correction (correction level) is lowered (for example, the correction is not performed) in such a case that the color unevenness is not conspicuous. According to the present embodiment, since the correction level is determined depending on the images of the overlap area SA and the non-overlap area NA, it is possible to suppress occurrence of such an inconvenience that the color of the image in the overlap area SA becomes to be a color different from the color which should be originally expressed, and/or such an inconvenience that the image of the overlap area SA becomes to be excessively light.

Figure 6B:
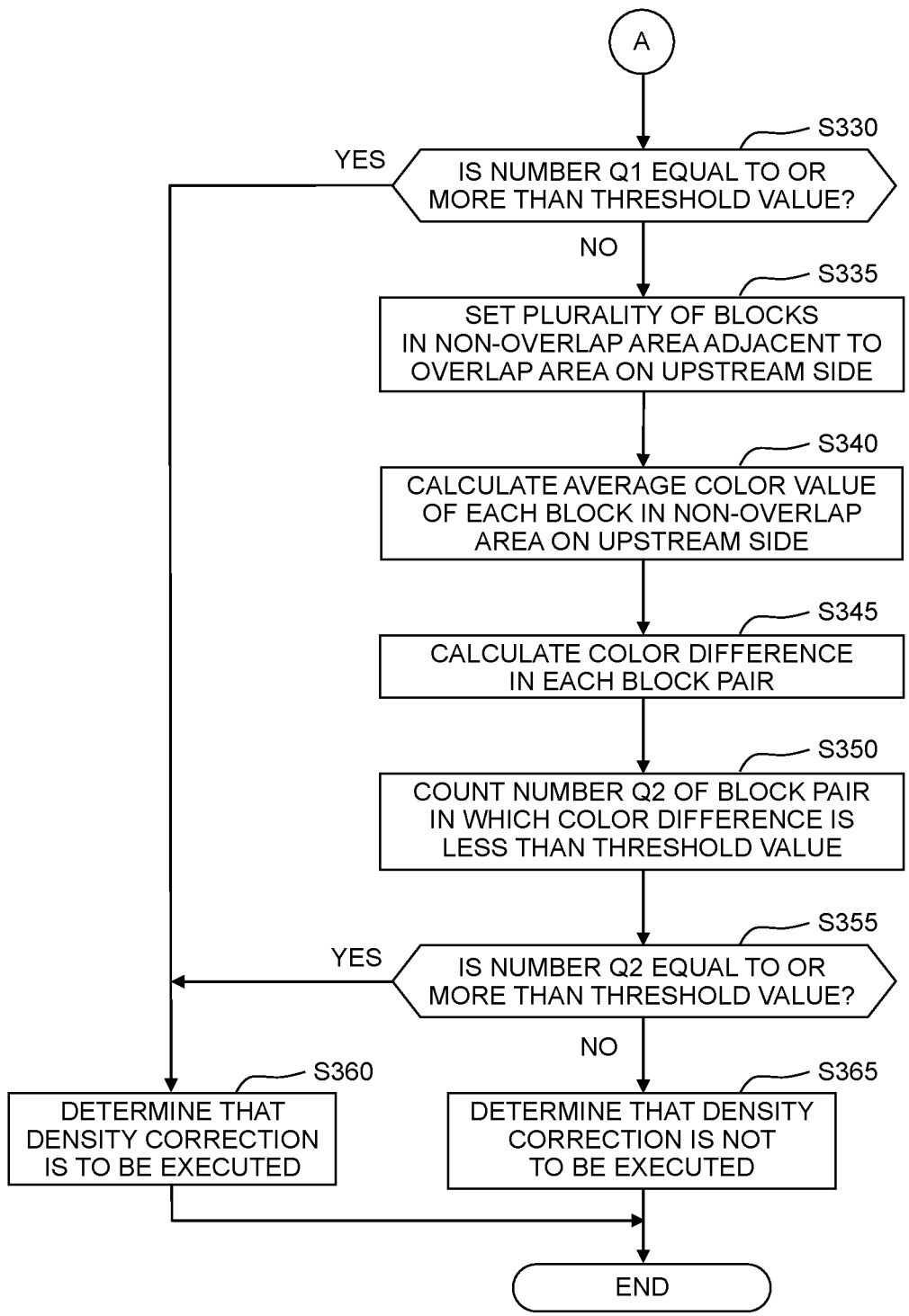
Figure 7:
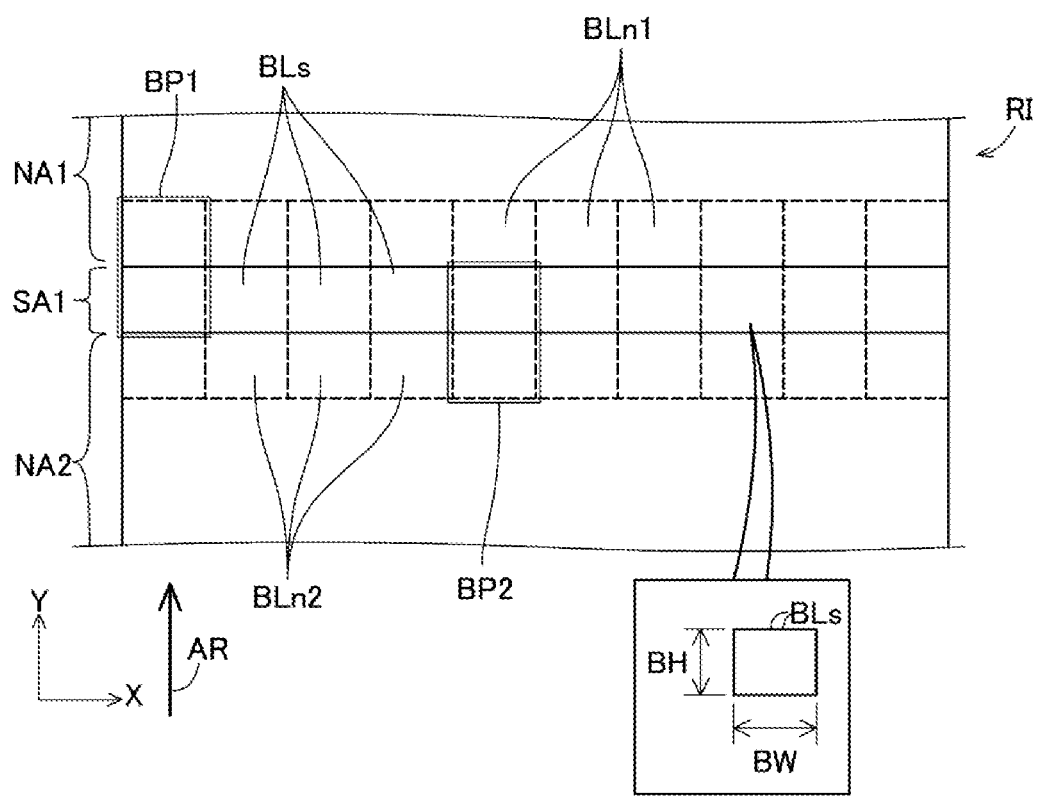
FIG. 7 is a view for explaining the density correction determining process of the first embodiment.

Further, in the present embodiment, in a case that a specific condition indicating that uniformity between the image in the overlap are SA and the image in the non-overlap area NA is higher than a reference is satisfied, the correction level is determined so that the extent by which the density of the image in the overlap area SA is lowered becomes greater than that in another case that the specific condition is not satisfied (steps S330, S355, S360, S365 of FIG. 6B). As the uniformity between the image in the overlap are SA and the image in the non-overlap are NA is higher, for example, any color unevenness occurring between the overlap are SA and the non-overlap are NA is more likely to be conspicuous. For example, in a case that the image in the overlap area SA and the image in the non-overlap area NA are solid images, respectively, the color unevenness is more likely to be conspicuous as compared with another case that each of the images is a photograph and/or a pattern in which color variation is great. According to the present embodiment, since the correction level is determined depending on the uniformity between the image in the overlap area SA and the image in the non-overlap area NA, it is possible to print the image in the overlap area SA in a suitable density so that any color unevenness is not conspicuous and that such an inconvenience that the color of the image in the overlap area SA becomes to be a color different from the color which should be originally expressed is suppressed.

More specifically, the specific condition in the present embodiment is a condition that one of the quantity Q1 of the block pair BP1 and the quantity Q2 of the block pair BP2 in which the color difference Δ1 and the color difference Δ2 are less than the threshold value TH1, respectively, is less than the threshold value TH2 (steps S330, S355, S360, S365 of FIG. 6B). In other words, in the present embodiment, the CPU 210 determines that the specific condition is satisfied in a case that the difference between the color of the image in the overlap area SA and the color of the image in the non-overlap area NA is smaller than the predetermined reference. Namely, the CPU 210 determines whether or not the color difference between the color of the overlap area SA and the color of the non-overlap area NA is not less than the threshold value; in a case that the color difference between the color of the overlap area SA and the color of the non-overlap area NA is not less than the threshold value, the CPU 210 performs the correction. As a result, it is possible to determine the correction level appropriately, based on the color of the image in the overlap area SA and the color of the image in the non-overlap area NA.

Furthermore, in the present embodiment, the CPU 210 determines the correction level based on the RGB image data including the color value of the RGB color system for each of the pixels (steps S305, S315, S340, etc., of FIGS. 6A and 6B). In other words, the CPU 210 determines the correction level based on the RGB image data, of the overlap area SA, including the color value of the RGB color system for each of the pixels, and based on the RGB image data, of the non-overlap area NA, including the color value of the RGB color system for each of the pixels. It is considered that the RGB image data before the RGB values thereof are converted to the CMYK values indicates the color of the image to be expressed more appropriately, than CMYK data obtained after the RGB values of the RGB image data are converted to the CYMK values. Accordingly, by determining the correction level based on the RGB image data, it is possible to evaluate the uniformity between the images to be expressed, etc., more appropriately and to determine the correction level. Moreover, in the overlap area-dot data generating process, the CPU 210 executes the color conversion process (step S400 of FIG. 8), executes the correcting processing with respect to the converted CMYK image data (step S420 of FIG. 8), and executes the halftone process with respect to the corrected CMYK data, thereby generating the dot data (step S430 of FIG. 8). The CYMK image data indicates the densities of the C, M, Y and K to be printed. Accordingly, by executing the correcting processing with respect to the CMYK image data, it is possible to appropriately correct the density of the image in the overlap area SA which is to be printed.

Further, according to the present embodiment, the CPU 210 determines the correction level by using two pieces of the partial image data corresponding, respectively, to two pieces of non-overlap areas NA (for example, NA1 and NA2 in FIG. 7) which are adjacent to a certain overlap area SA (for example, SA1 in FIG. 7) on the upstream side and on the downstream side, respectively, in the conveyance direction AR (FIGS. 6A and 6B). Namely, the image to be printed includes the overlap area SA (SA1) and the non-overlap area NA2 which is adjacent to the overlap area SA on the upstream side in the conveyance direction AR. In a case that the overlap area SA1 and the non-overlap area NA2 satisfy the specific condition, the CPU 210 performs the correction. As a result, it is possible to determine a more suitable correction level by considering the images of the two pieces of the non-overlap area NA, respectively, which are adjacent to the overlap area SA. For example, it is possible to suppress occurrence of such a situation that the color unevenness between the overlap area SA1 and the non-overlap area NA1 is conspicuous and the occurrence of such a situation that the color unevenness between the overlap area SA1 and the non-overlap area NA2 is conspicuous.

Furthermore, the printer 200 of the present embodiment is a so-called serial printer which prints the printing image PI by causing the printing mechanism 100 to execute, for a plurality of times, the partial printing SP of causing the printing head 110 to discharge the ink while performing the main scanning by using the dot data, and the conveyance (sub scanning) of the sheet M. In a case that the serial printer forms the plurality of dots constructing a raster line by using two nozzles, the above-described time-lag becomes to be greater than a line printer (to be described later on), any color unevenness between the color in the overlap area SA and the color of the non-overlap area NA easily occur in the serial printer. According to the present embodiment, it is possible to effectively suppress the above-described color unevenness in the serial printer in which the color unevenness easily occurs.

As appreciated from the foregoing explanation, the non-overlap area NA in the first embodiment is an example of a "first area", and the overlap area SA is an example of "second area". The partial image data included in the RGB image data and corresponding to the non-overlap area NA is an example of "first partial image data", and the partial image data included in the RGB image data and corresponding to the overlap area SA is an example of "second partial image data". Further, the non-overlap area-dot data generating process in steps S222 and S224 in FIG. 5 is an example of a "first area processing", and the overlap area-dot data generating process in steps S213 in FIG. 5 and in FIG. 8 is an example of a "second area processing".

Second Embodiment

Figure 10A:
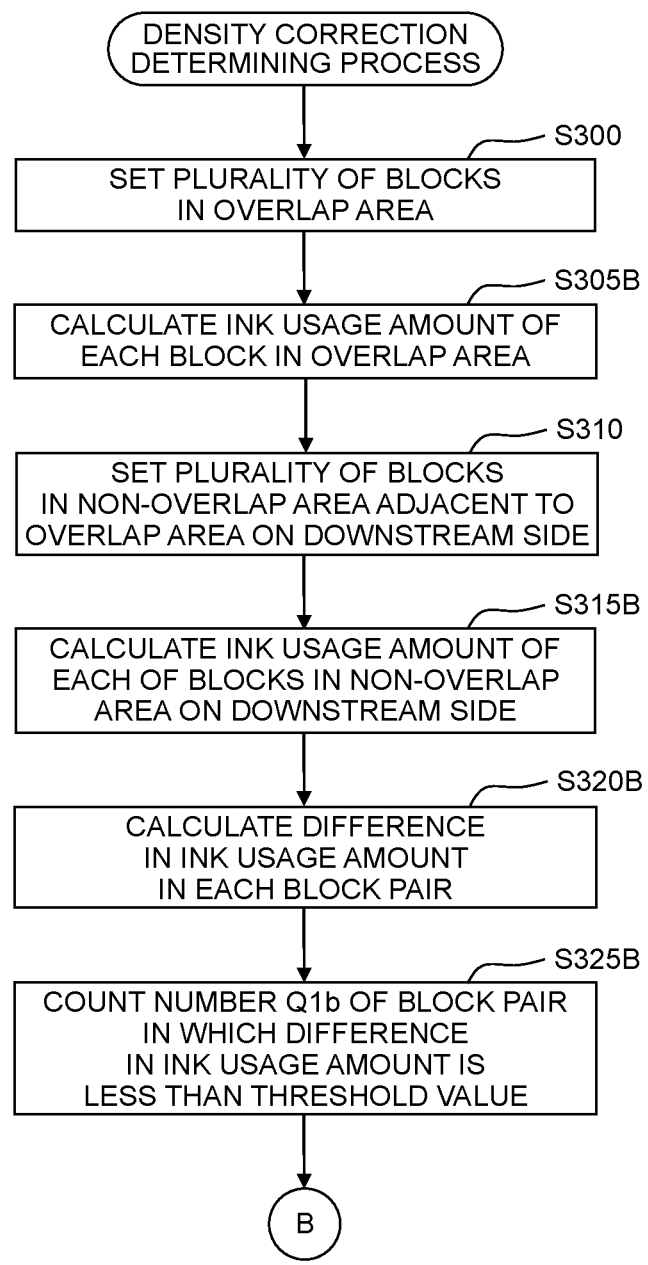
FIGS. 10A and 10B depict a flow chart of a density correction determining process of a second embodiment.
Figure 10B:
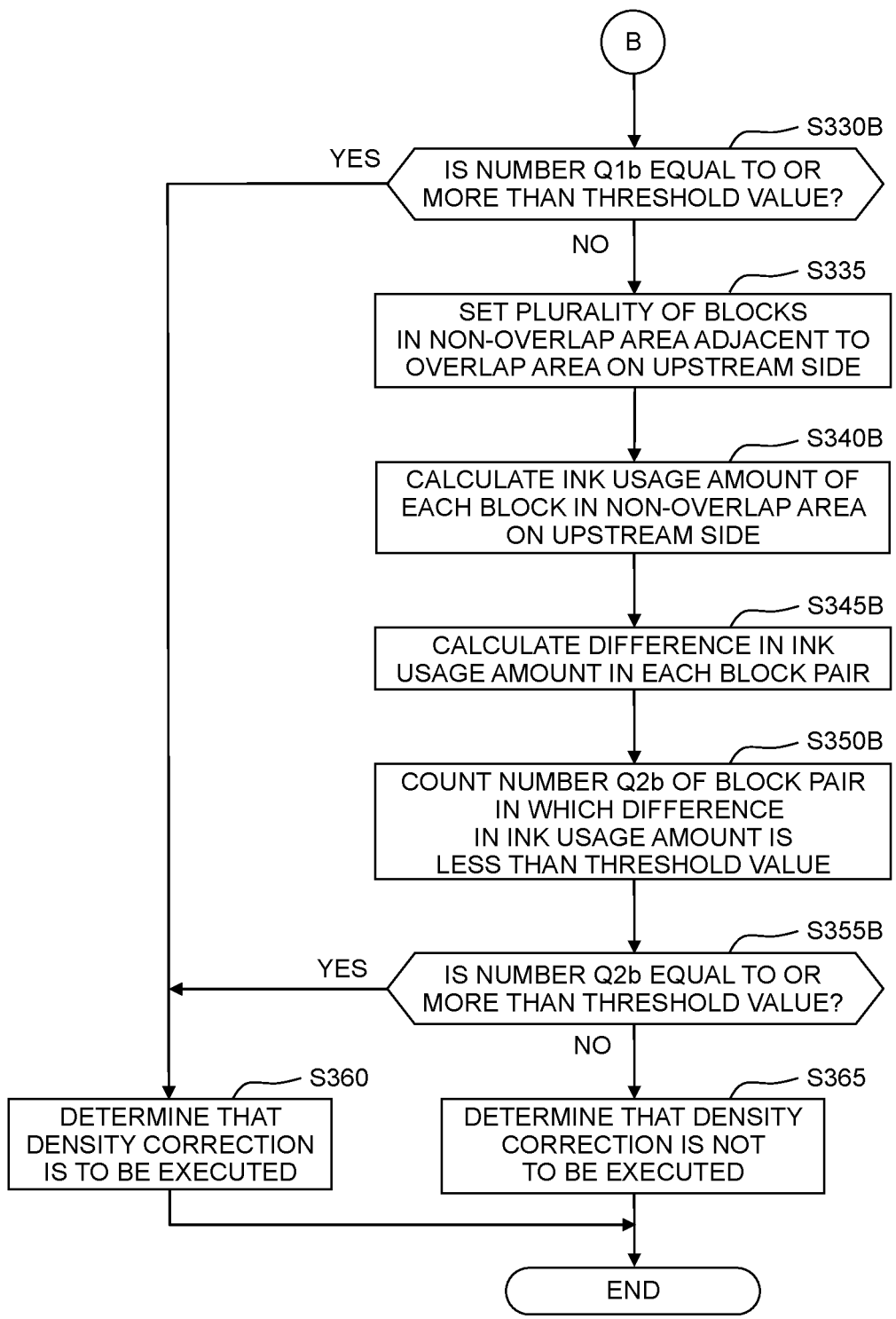

In a second embodiment, the content of the density correction determining process (FIGS. 6A and 6B) is different from that in the first embodiment. The remaining configuration of the second embodiment is same as that of the first embodiment. The density correction determining process of the second embodiment will be explained with reference to FIGS. 10A and 10B. In the flowchart of FIGS. 10A and 10B, processings same as those in the flowchart of FIGS. 6A and 6B are denoted by reference numerals same as those in FIGS. 6A and 6B, whereas processings different from those in the flowchart of FIGS. 6A and 6B have "B" added to the end of each of the reference numerals thereof In step S300 in FIG. 10A, the CPU 210 sets a plurality of blocks BLs in an overlap area SA at which the target raster line is located.

In step S305B, the CPU 210 calculates an ink usage amount of each of the blocks BLs in the overlap area SA. The ink usage amount of each of the blocks BLs is an estimated value of an usage amount of the ink to be used in a case of printing the image of each of the block BLs. For example, the ink usage amounts of C, M, Y and K, respectively, are calculated for each of the blocks BLs.

In the calculation of the ink usage amount, for example, any one of the following two methods is used. In a first method, the color conversion process and the halftone process are executed with respect to the partial image data included in the RGB image data and corresponding to the overlap area SA, thereby generating the dot data corresponding to the overlap area SA. Base on the dot data, the number of dots to be formed in each of the blocks BLs is counted for each one of the inks. A value obtained by multiplying the dot number with the ink amount per one dot is calculated as the ink usage amount. In a case that three kinds of dots which are large, medium and small dots are formed by one color ink, the dot number is counted for each of the three kinds of sizes, and the ink usage amount is calculated for each of the three kinds of sizes. The total sum of the ink usage amounts calculated for the three kinds of sizes, respectively, is calculated as a final ink usage amount. Namely, the CPU 210 executes the color conversion process and the halftone process with respect to the partial image data which is included in the RGB image data and which corresponds to the overlap area SA, and calculates the ink usage amount of the overlap area SA and the ink usage amount of the non-overlap area NA, based on the dot data. Note that in a case that the density correction is not performed, the dot data generated at the time of calculating the ink usage amount may be used at the time of printing.

In a second method, for example, a look-up table in which the RGB values and the usage amounts of the respective inks of C, M, Y and K are associated with each other is previously stored in the non-volatile storage 220. The CPU 210 refers to the look-up table and calculates the total of the ink usage amounts associated with each of the pixels of the block BLs. Alternatively, the CPU 210 refers to the look-up table and obtains the ink usage amounts associated with an average RGB value of each of the blocks BLs.

In step S310, the CPU 210 sets a plurality of pieces of a block BLn1 in a non-overlap area NA (for example, NA1 in FIG. 7) which is adjacent to the overlap area SA (for example, SA1 in FIG. 7) on the downstream side in the conveyance direction (FIG. 7).

In step S315B, the CPU 210 calculates an ink usage amount of each of the blocks BLn1 in the non-overlap area NA on the downstream side. The method of calculating the ink usage amount of each of the blocks BLn1 is similarly to the method of calculating the ink usage amount of each of the blocks BLs as described above.

In step S320B, the CPU 320 calculates difference AI1 in the usage amount in each of the block pairs BP1 (FIG. 7). For example, the difference AI1 in the usage amount is a total of differences between ink usage amounts (ICs, IMs, IYs, IKs) in the respective CMYK components of a block BLs and ink usage amounts (IC1, IM1, IY1, IK1) in the respective CMYK components of a block BLn1 constructing a block pair BP1, and is expressed by the following formula (2):

$$\Delta I1 = |ICs-IC1|+|IMs-IM1|+|IYs-IY1|+|IKs-IK1| \quad (2)$$

In step S325B, the CPU 210 counts a quantity Q1$b$ of a block pair BP1, among the block pairs BP1, of which difference AI1 in the ink usage amount is less than a predetermined threshold value TH1$b$. In step S330B, the CPU 210 determines whether or not the quantity Q1$b$ is not less than a threshold value TH2$b$.

In a case that the quantity Q1$b$ is less than the threshold value THb2 (step S330B: NO), then in step S335, the CPU 210 sets a plurality of pieces of a block BLn2 in a non-overlap area NA (for example, NA2 in FIG. 7) which is adjacent to the overlap area SA (for example, SA1 in FIG. 7) on the upstream side in the conveyance direction AR (FIG. 7).

In step S340B, the CPU 210 calculates an ink usage amount of each of the blocks BLn2 in the non-overlap area NA on the upstream side. In step S345B. the CPU 210 calculates difference AI2 in the ink usage amount in each of the block pairs BP2. The method of calculating the ink usage amount and the method of calculating the difference AI2 in the ink usage amount are similar to the method of calculating the ink usage of each of the blocks BLn1 and the method of calculating the difference AI1 in the ink usage amount in each of the block pairs BP1 as described above.

In step S350B, the CPU 210 counts a quantity Q2$b$ of a block pair BP2, among the block pairs BP2, of which difference AI2 in the ink usage amount is less than the predetermined threshold value TH1$b$. In step S355B, the CPU 210 determines whether or not the quantity Q2$b$ is not less than the threshold value TH2$b$.

In a case that the quantity Q1$b$ is not less than the threshold value TH2$b$ (step S330B: YES), and that the quantity Q2$b$ is not less than the threshold value TH2$b$ (step S355B: YES), then in step S360, the CPU 210 determines that the density correction is to be executed.

In a case that the quantity Q2$b$ is less than the threshold value TH2$b$ (step S355B: NO), then in step S365, the CPU 210 determines that the density correction is not to be executed.

According to the second embodiment as explained above, the CPU 210 calculates the ink usage amounts of the blocks BLn1 and BLn2 as an index value regarding the ink amount which is to be used in a case of printing the image in the non-overlap area NA and the ink usage amount of the block BLs as an index value regarding the ink amount which is to be used in a case of printing the image in the overlap area SA (steps S305B, S315B, S340B in FIGS. 10A and 10B). The CPU 210 determines that the specific condition for executing the correction is satisfied in a case that the difference between these ink usage amounts is smaller than the predetermined reference. Namely, the CPU 210 performs the correction based on the ink usage amount of the overlap area SA and the ink usage amount of the non-overlap are NA. Specifically, the CPU 210 determines that the specific condition is satisfied in a case that one of the quantity Q1$b$ of the block pair BP1 and the quantity Q2$b$ of the block pair BP2 in which the difference Δ1 and the difference Δ2 in the ink usage amounts are less than the threshold value TH1$b$, respectively, is less than the threshold value TH2$b$. As a result, it is possible to determine the correction level appropriately, based on the index values regarding the ink amounts which are to be used in cases of printing the image in the overlap area SA and the image in the non-overlap area NA. Namely, the CPU 210 determines whether or not the difference between the index value of the ink usage amount of the overlap area SA and the index value of the ink usage amount of the non-overlap area NA is less than the threshold value; in a case that the difference between the index value of the ink usage amount of the overlap area SA and the index value of the ink usage amount of the non-overlap area NA is less than the threshold value, the CPU 210 performs the correction. For example, it is considered that as the difference Δ1 and the difference Δ2 in the ink usage amounts are smaller, the image in the overlap area SA and the image in the non-overlap area NA have a similar color. Accordingly, it is considered that as the difference Δ1 and the difference Δ2 in the ink usage amounts are smaller, the uniformity between the images in the overlap area SA and the image in the non-overlap area NA is higher and that any color unevenness therebetween is more likely to be conspicuous.

Third Embodiment

Figure 11A:
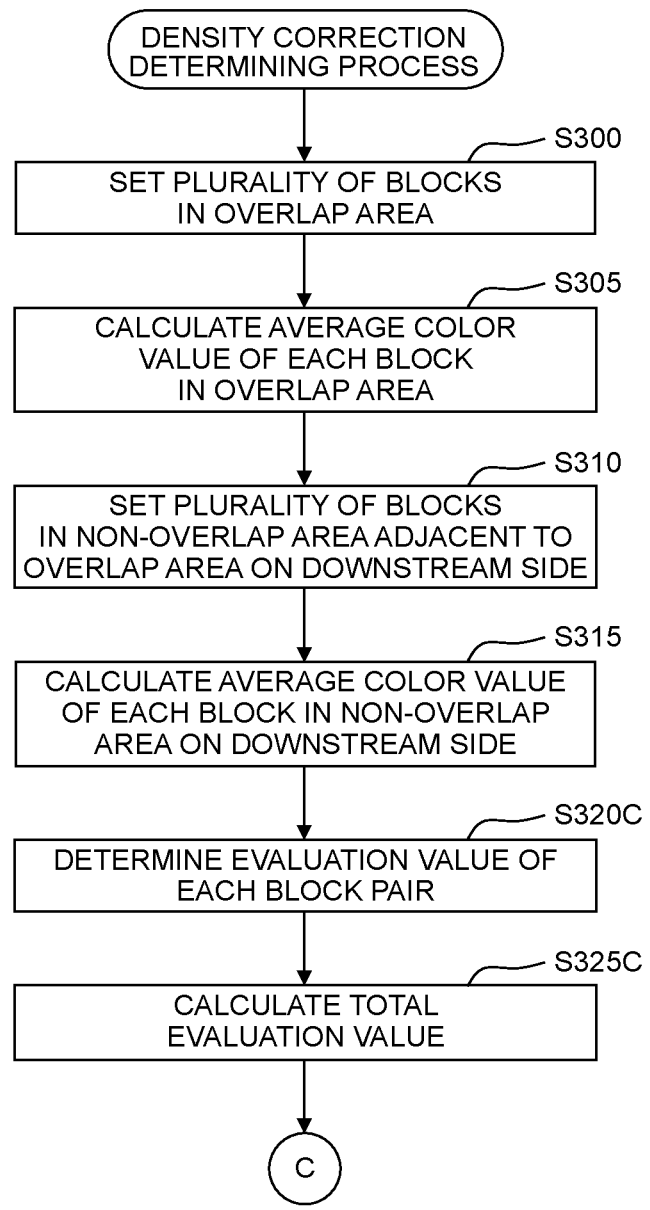
FIGS. 11A and 11B depict a flow chart of a density correction determining process of a third embodiment.
Figure 11B:
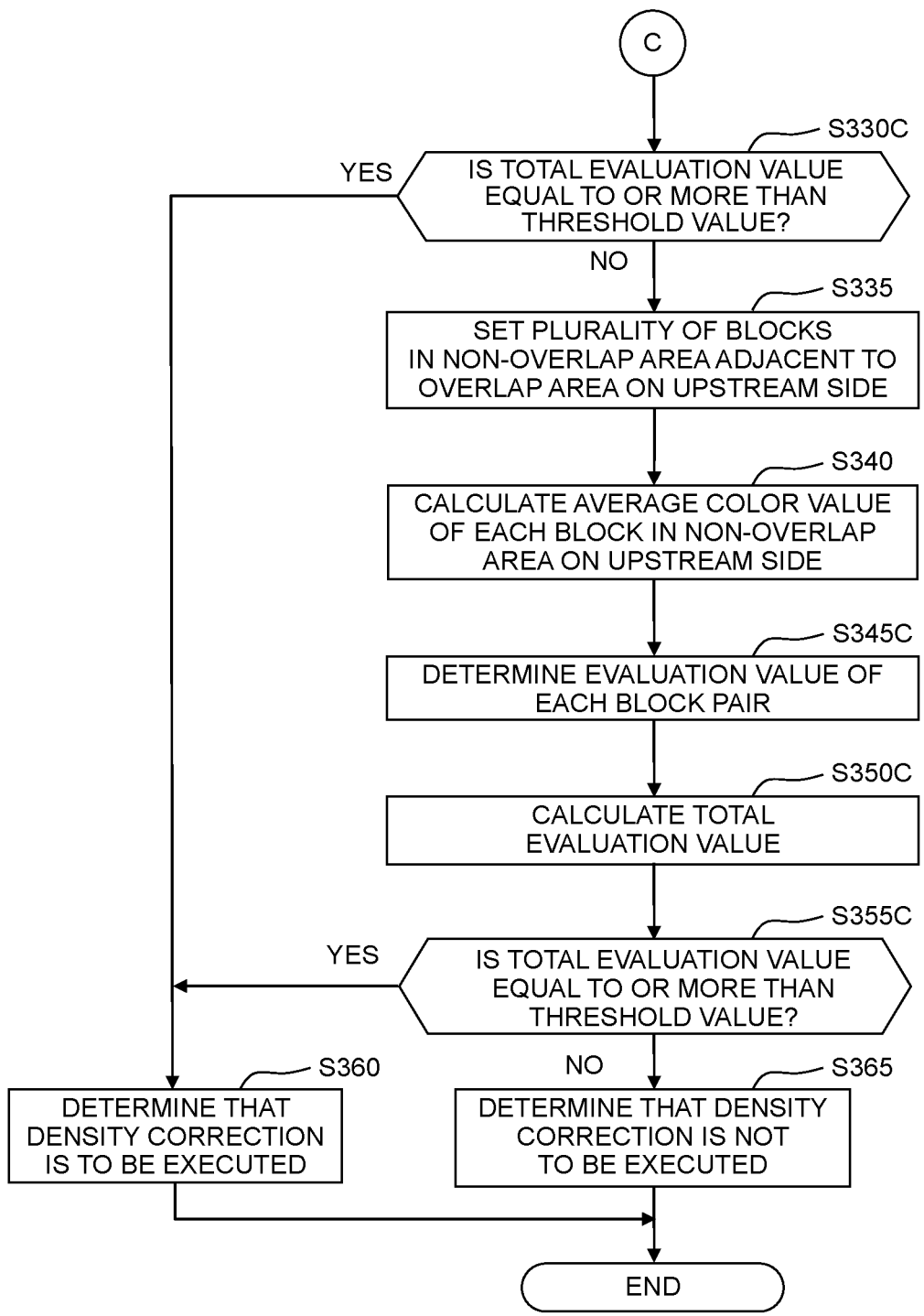

In a third embodiment, the content of the density correction determining process (FIGS. 6A and 6B) is different from that in the first embodiment. The remaining configuration of the third embodiment is same as that of the first embodiment. The density correction determining process of the third embodiment will be explained with reference to FIGS. 11A and 11B. In the flowchart of FIGS. 11A and 11B, processings same as those in the flowchart of FIGS. 6A and 6B are denoted by reference numerals same as those in FIGS. 6A and 6B, whereas processings different from those in the flowchart of FIGS. 6A and 6B have "C" added to the end of each of the reference numerals thereof In step S300 in FIG. 11A, the CPU 210 sets a plurality of blocks BLs in an overlap area SA at which the target raster line is located (FIG. 7). In step S305, the CPU 210 calculates an average color value for each of the blocks BLs in the overlap area SA.

In step S310, the CPU 210 sets a plurality of pieces of a block BLn1 in a non-overlap overlap area NA which is adjacent to the overlap area SA on the downstream side in the conveyance direction AR (FIG. 7). In step S315, the CPU 210 calculates an average color value of each of the blocks BLn1 in the non-overlap area NA on the downstream side.

In step S320C, the CPU 320 determines an evaluation value EV1 for each of the block pairs BP1 (FIG. 7). For example, the evaluation value EV1 is calculated with reference to color evaluating information CI. For example, the color evaluating information CI is prepared in advance and is stored in the non-volatile storage 220 (FIG. 1), together with the computer program CP.

Figure 12A:
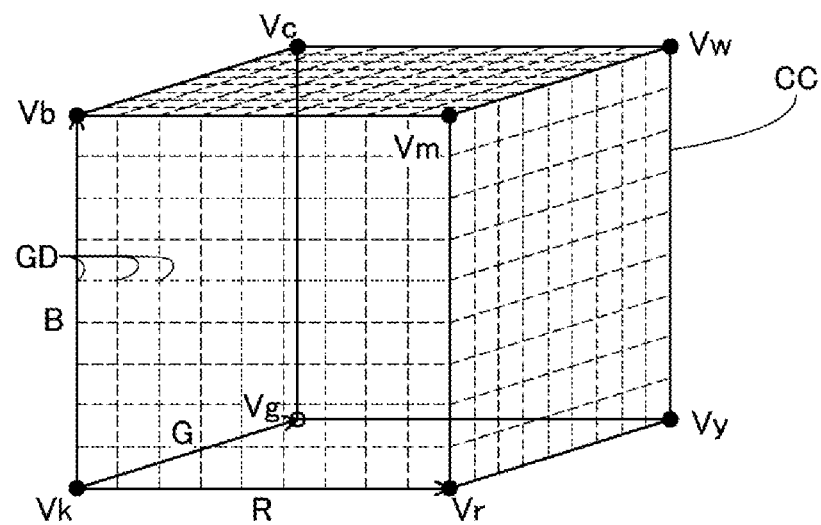

FIG. 12A indicates a RGB color space CC as a color space of the RGB color system. Reference numerals each indicating a color are affixed to 8 (eight) apexes of the RGB color space CC (specifically, a black apex Vk (0, 0, 0), a red apex Vr (255, 0, 0), a green apex Vg (0, 255, 0), a blue apex Vb (0, 0, 255), a cyan apex Vc (0, 255, 255), a magenta apex Vm (255, 0, 255), an yellow apex Vy (255, 255, 0) and a white apex Vw (255, 255, 255). The numbers inside the parenthesis indicate values of the respective components of (R, G, B). The value of R in each grid GD is any one of Q+1 pieces of values which are obtained by dividing the range of R (here, in a range of 0 (zero) to 255) with Q. This is similarly applicable to the respective values of green G and blue B in each grid GD. In the third embodiment, since Q=9, the cube of 9 pieces (729 pieces) of grid GD are set in the RGB color space CC.

FIG. 12B indicates an example of the color evaluating information CI. In the color evaluating information CI, a weight Wt is made to correspond to each of grid pairs constructed of two grids DG among the 729 pieces of the grid GD. For example, the color evaluating information CI includes one piece of main table MT and 729 pieces of corresponding tables CT1 to CT729. In the main table MT, one piece of the corresponding tables is associated with each of 729 pieces of the grid GD, on one-to-one basis. The corresponding table CT1 in FIG. 12B is a corresponding table associated with a first grid GD in the main table MT. In each of the corresponding tables (for example, CT1 in FIG. 12B), the weight Wt is made to correspond to each of the 729 pieces of the grid GD. The weight Wt of each of the grids GD in the corresponding table indicates an extent by which the color unevenness (color irregularity) is conspicuous in a case that the color of the RGB values of each of the grids GD and the color of the RGB values of another grid GD which is made to correspond to the corresponding table in the main table MT are arranged to be adjacent to each other. For example, as the weight Wt is greater, the color unevenness is likely to be more conspicuous. The color evaluating information CI is prepared, for example, by subjecting an image printed so that areas of two colors, respectively, which actually correspond to the grid pair are adjacent to each other, to a visual evaluation by a user.

The CPU 210 refers to the main table MT, and identifies (specifies) a corresponding table included in the corresponding tables and made to correspond to a grid GD included in the grids GD and closest to the average color value of blocks BLs which constructs each of the block pairs BP1 (FIG. 7). The CPU 210 refers to the identified corresponding table, and identifies a weight Wt made to correspond to the grid GD closest to the average color value of blocks BLn1 which constructs each of the block pairs BP1 (FIG. 7).

In step S325C, the CPU 210 calculates a total value of the evaluation values EV1 of a plurality of pieces of the block pair BP1. In step S330C, the CPU 210 determines whether or not the total of the evaluation values EV1 is not less than a threshold value THc.

In a case that the total value of the evaluation values EV1 is less than the threshold value THc (step S330C: NO), then in step S335, the CPU 210 sets a plurality of pieces of a block BLn2 in a non-overlap area NA which is adjacent to the overlap area SA on the upstream side in the conveyance direction AR (FIG. 7). In step S340, the CPU 210 calculates an average color value of each of the blocks BLn2 in the non-overlap area NA.

In step S345C, the CPU 210 determines an evaluation values EV2 of each of the block pair BP2. The determination of the evaluation value EV2 is performed by using the color evaluating information CI, similarly to the determination of the evaluation value EV1.

In step S350C, the CPU 210 calculates a total value of the evaluation values EV2 of a plurality of pieces of the block pair BP2. In step S355C, the CPU 210 determines whether or not the total of the evaluation values EV2 is not less than the threshold value THc.

In a case that the total value of the evaluation values EV1 is not less than the threshold value THc (step S330C: YES), and that the total value of the evaluation values EV2 is not less than the threshold value THc (step S355C: YES), then in step S360, the CPU 210 determines that the density correction is to be executed.

In a case that the total value of the evaluation values EV2 is less than the threshold value THc (step S355C: NO), then in step S365, the CPU 210 determines that the density correction is not to be executed.

According to the third embodiment as explained above, the printer 200 is provided with the storage (non-volatile storage 220) which stores the color evaluating information CI in which the value (weight Wt) indicating the extent of conspicuousness of the color unevenness is made to correspond to each of the combinations of colors. The CPU 210 uses the color evaluating information CI with respect to the combination of the color of the image in the overlap area SA and the color of the image in the non-overlap area NA so as to calculate the evaluation values EV1 and EV2 indicating the extent of conspicuousness of the color unevenness (steps S320C, S345C in FIGS. 11A and 11B). The CPU 210 determines the correction level based on the evaluation values EV1 and EV2 (steps S330C, S355C, 5360, S365 in FIG. 11B). Namely, the CPU 210 determines whether or not the value indicating the extent of the conspicuousness of the color unevenness is not less than the threshold value; in a case that the value indicating the extent of the conspicuousness of the color unevenness is not less than the threshold value, the CPU 210 performs the correction. As a result, it is possible to appropriately determine the correction level depending on the combination of the color of the image in the overlap area SA and the color of the image in the non-overlap area NA. For example, there is such a case that, depending on the combinations of colors, the extent of the conspicuousness of the color unevenness is different between the combinations of colors, even though the difference in the color is similar between the combinations of colors. Even in such a case, it is possible to appropriately determine the correction level.

[Modifications]

(1) In each of the above-described embodiments, the printer 200 is the serial printer provided with the main-scan section 130. Instead of this, the printer may be a so-called line printer which is not provided with the main-scan section. A printing head 110*d* in FIG. 13 is a printing head configured to print a monochrome image by using a K ink. Y direction in FIG. 13 is a conveyance direction ARd for the sheet M. The printing head 110*d* of the line printer is provided with a plurality of nozzles NZd aligned along a X-direction crossing the conveyance direction ARd over a length which is substantially same as the width in the X-direction of the sheet M. Namely, the conveyor 140 moves the sheet M relative to the printing head 110*d* in the direction crossing the direction in which the plurality of nozzles NZd are aligned.

The printing head 110*d* is provided with 3 pieces of head units HU1 to HU3. The head units HU1 to HU3 are located at positions in the X-direction which are mutually different, and arranged in an order of numbers thereof (1 to 3) affixed to the ends of reference numerals thereof, respectively, from an upstream end of the X-direction. 2 pieces of the head units HU1 and HU3 are located at positions in the Y-direction which are same to each other, whereas one head unit HU2 is located at a position in the Y-direction which is shifted relative to those of the head units HU1 and HU3. A part, of the head unit HU1, including a downstream end in the X-direction thereof is located at a position in the X-direction which overlaps with a part, of the head unit HU2, including an upstream end in the X-direction thereof A part, of the head unit HU2, including a downstream end in the X-direction thereof is located at a position in the X-direction which overlaps with a part, of the head unit HU3, including an upstream end in the X-direction thereof. A nozzle array (row) constructed of nozzles NZd of the K ink is formed in each of the head units HU1 to HU3.

FIG. 13 depicts an example of a printing image PId to be printed on the sheet M. The line printer discharges or ejects the ink from the print head 110*d* onto the sheet M which is (being) conveyed in the conveyance direction ARd to thereby form dots on the sheet M. With this, the printing image PId is printed. The printing image PId includes a plurality of raster lines RLd (for example, RLd1, RLd2 in FIG. 13) extending in the Y-direction (the conveyance direction ARd at the time of printing) and located at positions in the X-direction which are mutually different. Each of the raster lines RLd is a line in which a plurality of dots may be formed.

The printing image PId includes a plurality of non-overlap areas NAd (for example, non-hatched area NAd1 to NAd3 in FIG. 13), and a plurality of overlap areas SAd (for example, hatched areas SAd1, SAd2 in FIG. 13).

Each of the raster lines RLd (for example, RLd1 in FIG. 13) in the non-overlap area NAd corresponds to one nozzle NDz among the plurality of nozzles NZd. Namely, the dots of the K ink in each of the raster lines RLd in the non-overlap area NAd is formed by using one nozzle NDz.

Each of the raster lines RLd (for example, RLd2 in FIG. 13) in the overlap area SAd corresponds to two nozzle NDz among the plurality of nozzles NZz. Namely, the dots of the K ink in each of the raster lines RLd in the overlap area SAd is formed by using two nozzles NDz.

By providing the overlap area SAd between two pieces of the non-overlap area NAd in such a manner in the printing head 110*d* of the line printer, it is possible to suppress occurrence of such a situation that any white streak or black streak appears, in the printing image PId, at a joint part (seam part) between the head units.

In the line printer, there is a time-lag in the overlap area SAd between a timing at which a certain dot is formed by one nozzle and a timing at which another dot is formed by another nozzle. Accordingly, in the printing image PId, the density of the image in the overlap are SAd is likely to be higher than the density of the image in the non-overlap are NAd. In order to suppress the occurrence of such a situation, also in the line printer, an overlap area-dot data generating process similar to that in the first embodiment (FIG. 8) may be executed in a case of forming dot data corresponding to the overlap area SAd, and a non-overlap area-dot data generating process similar to that in the first embodiment (Steps S222, S224 in FIG. 5) may be executed in a case of forming dot data corresponding to the non-overlap area NAd. In this case, the correctio level in the overlap area-dot data generating process is determined by using partial image data included in the RGB image data and corresponding to the overlap area SAd (for example, SAd1 in FIG. 13), and partial image data included in the RGB image data and corresponding to the non-overlap area NAd which is adjacent to the overlap area SAd in the Y direction (for example, NAd1, NAd2 in FIG. 13). With this, it is possible to suppress such a situation that any color unevenness between the overlap area SAd and the non-overlap area NAd becomes to be conspicuous.

(2) In the density correction determining process in each of the above-described embodiments (FIGS. 6, 11, 12), the correction level is determined to be either one of the two steps which are the level of lowering the density of the image and the lever of not lowering the density of the image (step S360, step S365). Instead of doing so, the correction level may be determined to be either one of two levels which are a level of lowering the density of the image by a first correction amount, and a level of lowering the density of the image by a second correction amount smaller than the first correction amount. Further, the correction level may be determined from among not less than three steps of levels which are different from one another in at least one of the correction amount and the presence/absence of the correction. For example, as the uniformity between the image in the overlap are SA and the image in the non-overlap are NA is higher, the correction level may be determined to have a greater correction level. Generally, it is preferred that the correction level is determined such that, in a case that the specific condition indicating that the uniformity between the image in the overlap are SA and the image in the non-overlap are NA is high is satisfied, an extent of lowering the density of the image in the overlap area SA becomes to be greater than that in another case that the specific condition is not satisfied.

(3) In the density correction determining process in each of the above-described embodiments, the plurality of blocks BLs are set in the overlap area SA, and the plurality of blocks BLn1 or the plurality of blocks BLn2 are set in the non-overlap areas NA, and the color difference, the ink usage amount or the evaluation value is calculated for each of the blocks BLs, BLn1 and BLn2. Instead of doing so, for example, the color difference, the ink usage amount or the evaluation value may be calculated for each of the pixels, and the correction level may be calculated based on the color difference, the ink usage amount or the evaluation value. For example, the CPU 210calculates, with respect to each of a plurality of pixels constructing a raster line on a downstream end in the conveyance direction AR of the overlap area SA1 in FIG. 7, the color difference with respect to one of adjacent pixels constructing a raster line on an upstream end in the conveyance direction AR of the non-overlap area NA1 and which are adjacent, respectively, to the plurality of pixels constructing the raster line on the downstream end in the conveyance direction AR of the overlap area SA1. In a case that a sum total of the color differences is less than a threshold value, the CPU 210 may determine that a correction of lowering the density is to be executed, whereas in a case that the sum total of the color differences is not less than the threshold value, the CPU 210 may determine that the correction of lowering the density is not to be executed.

Further, in the density correction determining process, it is not necessarily indispensable that the entirety of the partial image data corresponding to the overlap area SA is used; only a part of the partial image data may be used. Similarly, in the density correction determining process, the entirety of the partial image data corresponding to the non-overlap area NA may be used, and only a part of the partial image data corresponding to the non-overlap area NA may be used.

Furthermore, in the density correction determining process of the second embodiment, the ink usage amount is used as the index value relating to the ink amount. Instead of doing so, another index value relating to the ink amount, such as, for example, a number of dot(s) may be used.

In the density correction determining process in each of the above-described embodiments, the correction level is determined by using the color difference, the ink usage amount, or the evaluation value. Together with, or instead of, each of these values, another index value may be used so as to determine the correction level. For example, in order to evaluate the uniformity between the image in the overlap area SA and the image in the non-overlap area NA, an index value indicating the variation in the values of the pixels within each of the overlap area SA and the non-overlap area NA, such as, for example, the dispersion may be used. For example, in a case that the dispersion between the values of the pixels in the overlap area SA and the values of the pixels in the non-overlap area NA is higher than a reference, it is considered that the uniformity between the image in the overlap area SA and the image in the non-overlap area NA is low. Accordingly, it may be determined that the correction of lowering the density is not to be executed, even in a case that the color difference is not more than the reference.

(4) The density correction determining process in each of the above-described embodiments uses both of the partial image data corresponding to the non-overlap area NA which is adjacent, with respect to the overlap area SA, on the upstream side in the conveyance direction AR and the partial image data corresponding to the non-overlap area NA which is adjacent, with respect to the overlap area SA, on the downstream side in the conveyance direction AR. Instead of doing so, only the partial image data corresponding to the non-overlap area NA which is adjacent, with respect to the overlap area SA, on the upstream side in the conveyance direction AR may be used, or only the partial image data corresponding to the non-overlap area NA which is adjacent, with respect to the overlap area SA, on the downstream side in the conveyance direction AR may be used. Namely, one of two pieces of the partial image data, which are the partial image data corresponding to the non-overlap area NA adjacent to the overlap area SA on the upstream side in the conveyance direction, and the partial image data corresponding to the non-overlap area NA adjacent to the overlap area SA on the downstream side in the conveyance direction, may be used.

(5) In the overlap area-dot data generating process in each of the above-described embodiments, the correcting processing (step S420 in FIG. 8) is executed with respect to the CMYK image data after the color conversion process. Instead of doing so, the correcting processing for lowering the density may be executed with respect to the RGB image data before being subjected to the color conversion process. Alternatively, for example, in the color conversion process in the overlap area-dot data generating process, the correction of lowering the density in the color conversion process may be executed, by using a lookup table for the overlap area which is adjusted to perform conversion to CMYK values of which density is lower than that in the ordinary lookup table. Still alternatively, in the halftone process in the overlap area-dot data generating process, for example, the correction of lowering the density may be executed in the halftone process, by using a value, as a relative density value of a dot used in the error diffusion, which indicates a density which is higher than that in an ordinary case.

(6) In each of the above-described embodiments, all the raster lines in one piece of the non-overlap area NA are each printed by one time of the partial printing SP. Instead of this, a plurality of pieces of the raster line, which are included in all the raster lines in one piece of the non-overlap area NA and which are adjacent to each other, may be printed by a plurality of times of the partial printing in a dividing manner (a so-called interlace printing). For example, an odd-numbered raster line in the non-overlap area NA may be printed by a first partial printing (the partial printing performed first), and an even-numbered raster line in the non-overlap area NA may be printed by a second partial printing (partial printing performed second). Even in this case, the plurality of dots formed in each of the raster lines in the non-overlap area NA is printed by one time of the partial printing by using one nozzle NZ. In a case that one piece of the non-overlap area NA is printed by two times of the partial printing, one piece of the overlap area SA is printed by four times of the partial printing. For example, a plurality of dots (to be) formed in an odd-numbered raster line in the overlap area SA is printed by two times of the partial printing using two nozzles NZ, whereas a plurality of dots (to be) formed in an even-numbered raster line in the overlap area SA is printed by other two times of the partial printing using the two nozzles NZ.

(7) In the overlap area-dot data generating process (FIG. 8) in each of the above-described embodiments, the correction of lowering the density in the entirety of the overlap area SA is executed so as to lower the density of the image in the overlap area SA. Instead of this, this correction may be executed only with respect to a part of the overlap area SA in the overlap area-dot data generating process. For example, a central part in the conveyance direction AR in the overlap area SA may not be corrected, and only parts in the vicinity of an upstream end and a downstream end, respectively, in the conveyance direction AR of the overlap area SA which are adjacent to the non-overlap areas NA, respectively, may be corrected so that the correction amount becomes greater in a stepped manner toward the upstream end and to the downstream end of the overlap area SA. According to the present modification, it is possible to suppress the occurrence of color unevenness between the overlap area SA and the non-overlap area(s) NA by correcting only a part(s) of the overlap area SA. Further, since only the part(s) of the overlap area SA is corrected, it is possible to lower such a risk that the color of the entirety of the overlap area SA is excessively changed by the correction.

(8) In the non-overlapping area-dot data generating process (steps S222, 5224 in FIG. 8) in each of the above-described embodiments, the correction of lowering the density is not executed with respect to the non-overlap area NA. Instead of doing so, the correction of lowering the density may be executed with respect to a part in the vicinity of an upstream end and/or a part in the vicinity of a downstream end, of the non-overlap area NA, which are adjacent to the overlap area SA. Namely, the processing of lowering the density may be executed with respect to the overlap area SA and an end part(s), of the non-overlap area NA, which is (are) adjacent to the overlap area SA. In such a case, for example, the correction amount (extent of lowering the density) for the non-overlap area NA may be smaller than that in the overlap area SA. According to the present modification, it is possible to suppress the occurrence of the color difference in the boundary between the overlap area SA and the non-overlap area NA, thereby making it possible to suppress, for example, the occurrence of any streak in the boundary between the overlap area SA and the non-overlap area NA.

(9) As the printing medium, another medium different from the sheet M, such as, for example, a film for OHP, a CD-ROM, a DVD-ROM, etc. may be used, instead of the sheet M.

(10) In the printing mechanism 100 of each of the above-described embodiments, the conveyor 140 conveys the sheet M to thereby move the sheet M, which is fixed, relative to the printing head 110. Instead of this, the printing head 110 may be moved relative to the sheet M in a direction opposite to the conveyance direction AR to thereby move the sheet M relative to the printing head 110 in the conveyance direction MR.

Figure 3:
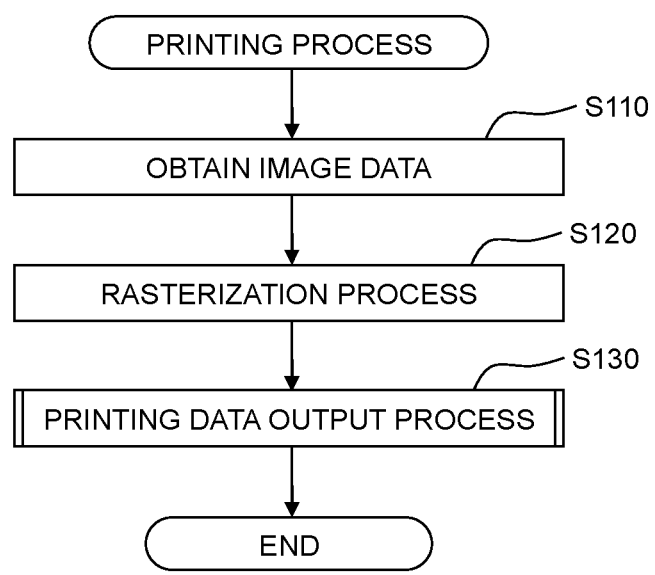
FIG. 3 is a flowchart of a printing process.

(11) In each of the above-described embodiments, the apparatus configured to execute the printing process in FIG. 3 is the printer 200. Instead of this, a terminal device such as a personal computer connected to the printer 200, etc., may execute the printing process in FIG. 3. In such a case, the CPU of the terminal device executes the printing process of FIG. 3 by, for example, executing a printer driver program. In such a case, the CPU of the terminal device transmits the partial printing data to the printer 200 in step S235 of FIG. 5 to thereby cause the printer 200, as the print execution section, to execute the printing.

Further, the apparatus configured to execute the printing process in FIG. 3 may be a server which obtains image data from a printer and/or a terminal device, and to generate a print job by using the obtained image data. Such a server may be a plurality of calculators which are capable of communicating with each other via a network.

(12) In each of the above-described embodiments, a part of the configuration realized by a hardware may be replaced by a software; on the contrary to this, a part or the entirety of the configuration realized by a software may be replaced with a hardware. For example, in a case that the printing process of FIG. 3 is executed by the printer 200, the halftone process and/or the color conversion process may be realized, for example, by a dedicated hardware circuit (for example, an ASIC) which is operated by an instruction from the CPU 210 of the printer 200.

In the foregoing, although the present disclosure has been explained based on the embodiments and the modifications, the aspect (embodiment) of the present disclosure is provided for the purpose that the present disclosure can be easily understood, and is not intended to limit or restrict the present disclosure in any way. The present disclosure may be changed and/or improved without deviating from the gist and spirit of the present disclosure and the scope of the claims, and may encompasses any equivalent thereof

What is claimed is:

1. A printing apparatus, comprising:
a print execution section; and
a controller,
wherein the print execution section includes:
a printing head having a plurality of nozzles arranged in a first direction, an ink having a specified color being discharged from the nozzles;
a head driver configured to drive the printing head to form a plurality of dots having the specified color on a printing medium by discharging the ink having the specified color from the nozzles; and
a movement mechanism configured to move the printing medium relative to the printing head in any of the first direction and a second direction intersecting with the first direction,
wherein the controller is configured to:
obtain a piece of object image data;
generate, by using the object image data, a plurality of pieces of dot data indicating formation states of the dots having the specified color, for a plurality of pixels; and
print a printing image by causing the print execution section to execute discharge of the ink having the specified color and movement of the printing medium by use of the pieces of dot data,
the printing image includes a plurality of raster lines, each of the raster lines including a part of the dots having the specified color, the part of the dots being arranged in the second direction,
the raster lines include a plurality of first raster lines included in a first area of the printing image, and a plurality of second raster lines included in a second area, of the printing image, which is adjacent to the first area in the first direction,
the part of the dots having the specified color and forming each of the first raster lines are formed by one nozzle included in the nozzles and corresponding to each of the first raster lines,
the part of the dots having the specified color and forming each of the second raster lines are formed by two or more nozzles included in the nozzles and corresponding to each of the second raster lines,
the controller is configured to:
execute a first area process on a piece of first partial image data included in the object image data and corresponding to the first area, to generate a plurality of pieces of first partial dot data included in the pieces of dot data and corresponding to the first area; and
execute a second area process on a piece of second partial image data included in the object image data and corresponding to the second area, to generate a plurality of pieces of second partial dot data included in the pieces of dot data and corresponding to the second area,
in the second area process, the pieces of second partial dot data are generated so that an image of the second area is printed at a density equal to or less than a density in a case that the first area process is executed on the second partial image data, and
the controller is configured to:
determine a correction level indicating a degree of lowering the density of the image in the second area in the second area process, by using the second partial image data included in the object image data and corresponding to the second area and the first partial image data included in the object image data and corresponding to the first area; and execute the second area process based on the correction level.

2. The printing apparatus according to claim 1, wherein in a case that a specific condition is satisfied, the controller is configured to determine the correction level so that the degree of lowering the density of the image in the second area becomes larger as compared with a case that the specific condition is not satisfied, and the specific condition indicates that uniformity between an image indicated by the first partial image data and an image indicated by the second partial image data is higher than a reference.

3. The printing apparatus according to claim 2, wherein in the case that the specific condition is satisfied, the controller is configured to determine the correction level so that the density of the image in the second area is lowered, and in the case that the specific condition is not satisfied, the controller is configured to determine the correction level so that the density of the image in the second area is not lowered.

4. The printing apparatus according to claim 2, wherein in a case that a difference between a color of the image indicated by the first partial image data and a color of the image indicated by the second partial image data is smaller than a predetermined reference, the controller is configured to determine that the specific condition is satisfied.

5. The printing apparatus according to claim 2, wherein the controller is configured to:

calculate a first index value regarding an amount of the ink used in a case of printing the image indicated by the first partial image data, and a second index value regarding an amount of the ink used in a case of printing the image indicated by the second partial image data; and determine that the specific condition is satisfied in a case that a difference between the first index value and the second index value is smaller than a predetermined reference.

6. The printing apparatus according to claim 1, further comprising a storage configured to store corresponding information in which values are associated with combinations of colors, respectively, wherein the controller is configured to:

calculate an evaluation value by using the corresponding information with respect to a combination of a color of an image indicated by the first partial image data and a color of an image indicate by the second partial image data; and determine the correction level based on the evaluation level.

7. The printing apparatus according to claim 1, wherein the controller is configured to:

obtain the object image data including a color value of a first color system, for each of the pixels; and determine the correction level based on the color value of the first color system of each of the pixels included in the second partial image data, and the color value of the first color system of each of the pixels included in the first partial image data, and the second area process includes:

converting the color value of the first color system to a color value of a second color system for the second partial image data, to thereby generate the second partial image data for which the conversion has been performed, the second color system including at least one component corresponding to at least one color of the ink used for printing by the print execution section;

correcting a value of the at least one component among color values of each of the pixels included in the second partial image data for which the conversion has been performed, and executing a halftone process on the second partial image data for which the correction has been performed to generate the plurality of pieces of second partial dot data.

8. The printing apparatus according to claim 1, wherein the controller is configured to determine the correction level by using two pieces of the first partial image data corresponding to two pieces of the first area, respectively, the two pieces of the first area being adjacent to the second area on an upstream side and a downstream side, respectively, in either one of the first direction and the second direction.

9. The printing apparatus according to claim 1, wherein the print execution section further includes a main scanning mechanism configured to execute a main scanning of moving the printing head along the second direction with respect to the printing medium, the movement mechanism is a sub scanning mechanism configured to execute a sub scanning of moving the printing medium relative to the printing head in the first direction, the controller is configured to print the printing image on the recording medium by causing the print execution section to execute, a plurality of times, a partial printing and the sub scanning by use of the plurality of pieces of dot data, the ink of the specified color being discharged in the partial printing from the nozzles while executing the main scanning, the part of the dots having the specified color forming each of the first raster lines in the first area are formed by one time of the partial printing, and the part of the dots having the specified color forming each of the second raster lines in the second area are formed by two or more times of the partial printing.

10. A non-transitory computer-readable medium storing a computer program for controlling a print execution section, the print execution section including: a printing head having a plurality of nozzles arranged in a first direction, an ink having a specified color being discharged from the nozzles, a head driver configured to drive the printing head to form a plurality of dots having the specified color on a printing medium by discharging the ink having the specified color from the nozzles; and a movement mechanism configured to move the printing medium relative to the printing head in any of the first direction and a second direction intersecting with the first direction, the computer program, when executed by a processor of the computer, causing the computer to:

obtain a piece of object image data;

generate, by using the object image data, a plurality of pieces of dot data indicating formation states of the dots having the specified color, for a plurality of pixels; and print a printing image by causing the print execution section to execute discharge of the ink having the specified color and movement of the printing medium by use of the pieces of dot data, wherein the printing image includes a plurality of raster lines, each of the raster lines including a part of the dots having the specified color, the part of the dots being arranged in the second direction, the raster lines include a plurality of first raster lines included in a first area of the printing image, and a plurality of second raster lines included in a second area, of the printing image, which is adjacent to the first area in the first direction, the part of the dots having the specified color and forming each of the first raster lines are formed by one nozzle included in the nozzles and corresponding to each of the first raster lines, the part of the dots having the specified color and forming each of the second raster lines are formed by two or more nozzles included in the nozzles and corresponding to each of the second raster lines, the computer program causes the computer to:
  execute a first area process on a piece of first partial image data included in the object image data and corresponding to the first area, to generate a plurality of pieces of first partial dot data included in the pieces of dot data and corresponding to the first area; and
  execute a second area process on a piece of second partial image data included in the object image data and corresponding to the second area, to generate a plurality of pieces of second partial dot data included in the pieces of dot data and corresponding to the second area, in the second area process, the pieces of second partial dot data are generated so that an image of the second area is printed at a density equal to or less than a density in a case that the first area process is executed on the second partial image data, and the computer program causes the computer to:
  determine a correction level indicating a degree of lowering the density of the image in the second area in the second area process, by using the second partial image data included in the object image data and corresponding to the second area and the first partial image data included in the object image data and corresponding to the first area; and
  execute the second area process based on the correction level.

11. A printing apparatus comprising:
a head configured to discharge ink; and
a controller,
wherein the controller is configured to:
obtain an object image including a first partial image and a second partial image;
print a first overlap area and a nonoverlapping area, the first overlap area being included in the first partial image and overlapping with the second partial image, the first non-overlapping area being included in the first partial image and not overlapping with the second partial image; and
correct density of the first overlapping area by reducing an usage amount of the ink in the first overlapping area, and
the controller is configured to correct the density of the first overlapping area in a case that the first overlapping area and the first non-overlapping area satisfy a specific condition.

12. The printing apparatus according to claim 11, wherein the controller is configured to correct the density of the first overlapping area based on a color of the first overlapping area and a color of the first non-overlapping area.

13. The printing apparatus according to claim 12,
wherein the controller is configured to determine whether a color difference between the color of the first overlapping area and the color of the first non-overlapping area is equal to or more than a first threshold value, and
in a case that the color difference between the color of the first overlapping area and the color of the first non-overlapping area is equal to or more than the first threshold value, the controller is configured to correct the density of the first overlapping area.

14. The printing apparatus according to claim 11, further comprising a conveying mechanism configured to convey a printing medium in a conveyance direction,
wherein each of the first overlapping area and the first non-overlapping area is divided into a plurality of blocks in a direction intersecting with the conveyance direction,
the first overlapping area includes a first block,
the first non-overlapping area includes a second block adjacent to the first block in the conveyance direction,
the controller is configured to:
  determine whether a color difference between a color of the first block and a color of the second block is equal to or more than a second threshold value; and
  correct the density of the first overlapping area based on determining that the color difference between the color of the first block and the color of the second block is equal to or more than the second threshold value.

15. The printing apparatus according to claim 11, wherein the controller is configured to correct the density of the first overlapping area based on an ink usage amount for the first overlapping area and an ink usage amount for the first non-overlapping area.

16. The printing apparatus according to claim 15, wherein the controller is configured to:
  generate a plurality of pieces of dot data indicating the object image; and
  calculate the ink usage amount in the first overlapping area and the ink usage amount in the first non-overlapping area based on the pieces of dot data.

17. The printing apparatus according to claim 15, wherein the controller is configured to:
  determine whether a difference between an index value of the ink usage amount for the first overlapping area and an index value of the ink usage amount for the first non-overlapping area is less than a third threshold value; and
  correct the density of the first overlapping area, in a case that the difference between the index value of the ink usage amount for the first overlapping area and the index value of the ink usage amount for the first non-overlapping area is less than the third threshold value.

18. The printing apparatus according to claim 11, further comprising a storage configured to store corresponding information in which values are associated with combinations of colors, respectively,
wherein the controller is configured to:
  calculate a value by using the corresponding information with respect to a combination of a color of the first partial image and a color of the second partial image;
  determine whether the value is equal to or more than a fourth threshold value; and
  correct the density of the first overlapping area, in a case that the value is equal to or more than the fourth threshold value.

19. The printing apparatus according to claim 18, wherein the controller is configured to obtain the value for each of a plurality of pixels.

20. The printing apparatus according to claim 11,
wherein the second partial image includes the first overlapping area and a second non-overlapping area included in the second partial image and not overlapping with the first partial image, and in a case that the first overlapping area and the second non-overlapping area satisfy the specific condition, the controller is configured to correct the density of the first overlapping area.

\* \* \* \* \*